US011803787B1

(12) United States Patent
Shaw et al.

(10) Patent No.: US 11,803,787 B1
(45) Date of Patent: *Oct. 31, 2023

(54) SYSTEM AND METHOD FOR OUTSOURCING PROJECTS

(71) Applicant: DEVFACTORY INNOVATIONS FZ-LLC, Dubai Media (AE)

(72) Inventors: Hemant Shaw, Austin, TX (US); Joseph A. Liemandt, Austin, TX (US)

(73) Assignee: DevFactory Innovations FZ-LLC, Dubai Media (AE)

( * ) Notice: Subject to any disclaimer, the term of this patent is extended or adjusted under 35 U.S.C. 154(b) by 77 days.

This patent is subject to a terminal disclaimer.

(21) Appl. No.: 17/205,584

(22) Filed: Mar. 18, 2021

Related U.S. Application Data

(63) Continuation of application No. 16/539,379, filed on Aug. 13, 2019, now Pat. No. 10,984,353, which is a
(Continued)

(51) Int. Cl.
*G06Q 10/063* (2023.01)
*G06F 11/36* (2006.01)
(Continued)

(52) U.S. Cl.
CPC .......... *G06Q 10/063* (2013.01); *G06F 8/70* (2013.01); *G06F 11/3616* (2013.01); *G06Q 10/06* (2013.01); *G06Q 50/188* (2013.01)

(58) Field of Classification Search
CPC .... G06Q 10/063; G06Q 10/06; G06Q 50/188; G06F 8/70; G06F 11/3616
See application file for complete search history.

(56) References Cited

U.S. PATENT DOCUMENTS

| 5,765,138 A | * | 6/1998 | Aycock | G06Q 30/06 |
| | | | | 705/7.41 |
| 5,826,244 A | * | 10/1998 | Huberman | G06Q 30/06 |
| | | | | 705/37 |

(Continued)

OTHER PUBLICATIONS

Notice of Allowance dated Dec. 18, 2020, filed in U.S. Appl. No. 16/539,379, pp. 1-11.
(Continued)

*Primary Examiner* — Rutao Wu
*Assistant Examiner* — Stephen S Swartz
(74) *Attorney, Agent, or Firm* — Terrile, Cannatti & Chambers, LLP

(57) ABSTRACT

A method, system, apparatus, and computer program product for efficiently outsourcing projects, such as software development projects, are presented. A business entity may precisely and succinctly define one or more requests for proposals (RFPs) using predefined service identifiers which specify discrete, short-term projects (e.g., 4 weeks or less) with fixed inputs and outputs and objective evaluation metrics which allow for each project to be evaluated using, for example, automated evaluation software tools. By posting RFPs on a web site, the business entity solicits bids from third party vendors to perform the project identified in the RFP. Since individual projects are identified with objective inputs, outputs, and evaluation metrics, vendors can bid on the project with minimal evaluation and speculation regarding the appropriate bidding price for the project. When a bid is accepted or awarded to a vendor, a contract for the project can be easily prepared using the identifying information for the winning bid, such as the timeline, price, and the specific service identified with the project. Such short timeline projects allow the projects to be concisely described, results returned quickly, shortened evaluation duration, and payment within a normal monthly cycle.

13 Claims, 40 Drawing Sheets

Related U.S. Application Data continuation of application No. 12/049,816, filed on Mar. 17, 2008, now Pat. No. 10,402,757.

(60) Provisional application No. 60/895,267, filed on Mar. 16, 2007.

(51) Int. Cl.
*G06F 8/70* (2018.01)
*G06Q 10/06* (2023.01)
*G06Q 50/18* (2012.01)

(56) References Cited

U.S. PATENT DOCUMENTS

| | | | | |
|---|---|---|---|---|
| 6,647,374 | B2* | 11/2003 | Kansal | G06Q 10/0639 |
| | | | | 705/37 |
| 6,986,125 | B2* | 1/2006 | Apuzzo | G06F 11/3684 |
| | | | | 717/124 |
| 7,035,809 | B2* | 4/2006 | Miller | G06Q 10/06 |
| | | | | 705/7.23 |
| 7,321,864 | B1* | 1/2008 | Gendler | G06Q 10/063114 |
| | | | | 705/7.17 |
| 7,333,942 | B1* | 2/2008 | Cowles | G06Q 30/06 |
| | | | | 705/37 |
| 7,644,390 | B2* | 1/2010 | Khodabandehloo | G06F 30/20 |
| | | | | 717/113 |
| 2001/0025267 | A1* | 9/2001 | Janiszewski | G06Q 40/04 |
| | | | | 705/26.1 |
| 2002/0049642 | A1* | 4/2002 | Moderegger | G06Q 30/08 |
| | | | | 705/26.4 |
| 2002/0165723 | A1* | 11/2002 | Kroeger | G06Q 10/06 |
| | | | | 705/315 |
| 2006/0149658 | A1* | 7/2006 | Smith | G06Q 30/08 |
| | | | | 705/37 |
| 2006/0235732 | A1* | 10/2006 | Miller | G06Q 10/06313 |
| | | | | 705/7.23 |

OTHER PUBLICATIONS

Terminal Disclaimer—Filed dated Oct. 15, 2020, filed in U.S. Appl. No. 16/539,379, p. 1.
Terminal Disclaimer—Approved dated Oct. 15, 2020, filed in U.S. Appl. No. 16/539,379, p. 1.
Response to Final Office Action dated Oct. 14, 2020, filed in U.S. Appl. No. 16/539,379, pp. 1-8.
Final Rejection dated May 14, 2020, filed in U.S. Appl. No. 16/539,379, pp. 1-8.
Response to Non-Final Office Action dated Mar. 3, 2020, filed in U.S. Appl. No. 16/539,379, pp. 1-9.
Non-Final Rejection dated Oct. 3, 2019, filed in U.S. Appl. No. 16/539,379, pp. 1-13.

* cited by examiner

Outsourcing Motivation

- Software/Technology is becoming commoditized
  - Increasing global competition
  - Constant pressure to lower costs Cost → Local Experts → Offshore Experts → Outsourcers

- Offshoring usually comes first
  - India, China, and others offer cost effective technical talent
  - Offshore resources become experts and function as normal team members
- Outsourcing is next
  - "Code factory" vendors produce high volume at low cost
  - Outsourcing lowers costs further through competitive bidding

*FIGURE 2*

Outsourcing Strategy

Service Characteristics :

- Easy to specify/define
  - Requirements can be summarized in 1 page
- Easy to measure
  - "90% code coverage", "MI of >=100", "twice as fast", "half the memory"
- High volume/repetitive
  - Give vendors an incentive to build expertise over time where needed

Strategy :

- Formalizing the outsourcing process with a services model
- Carefully defining appropriate outsourceable tasks into services
- Establish a marketplace for competitive bidding to lower costs
- Sufficient $ volume every week to keep vendors interested in this model.

*FIGURE 3*

Outsourcing Services

Horizontal Services :

1. Double/Double/Double Service
2. Code Coverage Service
3. Refactoring Service
4. Production Support Service
5. API Fulfillment
6. User Interface Fulfillment
7. Specification Fulfillment Service

*FIGURE 5*

Double/Double/Double Service

Definition :

Given a codebase, double the performance, scalability and reduce mean time to failure of the codebase for specific platform requirements. At any time the project will request for one of the axis to be improved (performance/scalability/mttf)

Inputs :

1. Codebase
2. Regression test suite along with platform specifications (h/w, s/w and o/s)
3. Double/Double/Double test cases

Outputs :

1. Re-engineered codebase with double the performance/scalability/mttf
2. Documentation and enhanced test cases

Quantity : (forecast for # projects of this type over the next 3 months)

*FIGURE 6*

Code Coverage Service

Definition:

Given a codebase, provide an automated test suite that meets 100% method and 90% line coverage.

Inputs:

1. Codebase
2. Preference of testing tool (Junit, HttpUnit, CppUnit, Selenium, Winrunner etc.)

Outputs:

1. Automated Test suite that meets the coverage metric of 100% method and 90% line.
2. Documentation, installation and support scripts for the testsuite

Quantity: (forecast for # projects of this type over the next 3 months)

*FIGURE 7*

Refactoring Service

Definition:

Given a codebase, refactor it to achieve a Maintainability Index (MI)\*of at least 100 with no change in functionality or performance.

Inputs:

1. Codebase
2. Regression Test suite

Outputs:

1. Refactored codebase with no performance degradation and MI value of >=100
2. Updated test suite
3. Code Documentation

Quantity: (forecast for # projects of this type over the next 3 months)

*FIGURE 8*

Production Support Service

Definition :

Given an application and access to hosting infrastructure, provide production support services.

Inputs :

1. Application/codebase/website
2. Access to Hosting infrastructure
3. Service Level Agreement (SLA) – run book, monitoring and escalation points

Outputs :

1. Production Support and Management of Hosting Infrastructure for the application/website
2. Adherence to the SLA (uptime, performance, bandwidth etc.)

*FIGURE 9*

API Fulfillment Service

Definition :

Given an interface specification, provide the implementation that supports the interface, has full test automation (100% method, 90% line), and has a maintainability index of >=100.

Inputs :

1. Interface definition
2. Dependencies – codebase and dependent library references (build file if necessary)
3. List of preferred libraries

Outputs :

1. Implementation files that support interface
2. Documentation and enhanced test cases

Quantity : (forecast for # projects of this type over the next 3 months)

*FIGURE 10*

User Interface Fulfillment Service

Definition :
  Given an interface specification, provide the implementation that supports the interface

Inputs :
  1. Interface definition in one of these forms : wireframes, photoshop documents or jpeg
  2. Implementation technology – javascript/css, html, ajax etc.

Outputs :
  1. Implementation files that support interface
  2. Documentation and test cases where applicable

Quantity : (forecast for # projects of this type over the next 3 months)

*FIGURE 11*

Specification Fulfillment Service

Definition :

Given a set of software specifications, provide a codebase that meets the specifications. These are projects that right now don't fall into one of the pre-defined service categories.

Inputs :

1. System Requirements Specification(SRS) and Architecture documents
2. User Interface Specification i.e., Visual design if applicable
3. Existing tools or codebase if applicable

Outputs :

1. New codebase that meets the specification
2. Automated test suite that meets the acceptable coverage requirements
3. Documentation

Quantity : (forecast for # projects of this type over the next 3 months)

*FIGURE 12* gDEV Outsourcing Network

Specialization Records

Partner: SoftServe ~1805

| | Service Type | Count | Success Count | Failure Count | Success Rate | Validation Date | Count | Success Count | Failure Count | Success Rate | Rating |
|---|---|---|---|---|---|---|---|---|---|---|---|
| | | | | | Latest Projects | | | Current Rating | | | |
| 1 | 2x/2x/2x | 17 | 13 | 4 | 76% | 2007-11-16 - 2008-02-22 | 15 | 12 | 3 | 80% | Award |
| 2 | Automated Test Case Creation | 17 | 16 | 1 | 94% | 2008-01-25 - 2008-02-22 | 15 | 14 | 1 | 93% | Award |
| 3 | Bug Fix | 19 | 12 | 7 | 63% | 2008-01-25 - 2008-02-22 | 46 | 40 | 6 | 87% | Award |
| 4 | Build Management - Dependency | 16 | 16 | 0 | 100% | 2007-11-16 - 2008-02-22 | 15 | 12 | 3 | 80% | Award |
| 5 | Build Management Service | 24 | 22 | 2 | 92% | 2007-09-21 - 2008-02-22 | 15 | 14 | 1 | 93% | Award |
| 6 | DCM Loaders & Extractors | 6 | 6 | 0 | 100% | 2007-06-01 - 2008-02-22 | 5 | 5 | 0 | 100% | Invest |
| 7 | DCM Reports | 1 | 1 | 0 | 100% | 2007-06-01 - 2008-02-22 | 1 | 1 | 0 | 100% | Invest |
| 8 | DCM UI & Validators | 4 | 3 | 1 | 75% | 2007-06-01 - 2008-02-22 | 0 | 0 | 0 | 0% | Invest |
| 9 | DOS Modeling | 18 | 17 | 1 | 94% | 2007-12-07 - 2008-02-22 | 15 | 15 | 0 | 100% | Award |
| 10 | Prototype Website Creation | 12 | 8 | 4 | 67% | 2007-06-01 - 2008-02-22 | 12 | 8 | 4 | 67% | Invest |
| 11 | Scoring | 16 | 15 | 1 | 94% | 2007-08-17 - 2008-02-22 | 15 | 14 | 1 | 93% | Award |
| 12 | Spec Fulfillment | 23 | 21 | 2 | 91% | 2008-01-25 - 2008-02-22 | 15 | 15 | 0 | 100% | Award |
| 13 | Test Case Definition Service | 19 | 19 | 0 | 100% | 2007-11-02 - 2008-02-22 | 15 | 15 | 0 | 100% | Award |
| 14 | UI Fulfillment | 27 | 24 | 3 | 89% | 2008-01-25 - 2008-02-22 | 15 | 13 | 2 | 87% | Award |
| 15 | Use case Implementation | 23 | 18 | 5 | 78% | 2008-01-25 - 2008-02-22 | 15 | 13 | 2 | 87% | Award |
| 16 | Use Case Modification Service | 15 | 9 | 6 | 60% | 2008-01-04 - 2008-02-22 | 15 | 13 | 2 | 87% | Award |
| 17 | YBB Parse E-Bill Service | 0 | 0 | 0 | N/A | 2007-06-01 - 2008-02-22 | 0 | 0 | 0 | 0% | Invest |

2x Service

Definition:

Given a codebase, double the performance or scalability, or reduce mean time to failure of the codebase for specific platform requirements. At any time the project will request one of the axes to be improved (performance/scalability/mttf).

Inputs:

1. Codebase.
2. Regression test suite along with platform specifications (h/w, s/w and o/s).
3. Double/Double/Double test cases.
4. Performance specification should include the following:
   - Required data set profile (how many objects of each type should be pre-existing in the system, for each object type what is the statistical distribution of object size).
     - For example (in an order entry system): 100,000 Customers in DB, 1M products, with 20,000 Orders. Orders vary in size from 2-5000 lineitems with the following distribution.
   - User load under which the performance test should be done, with statistics on distributions:
     - For example, 10,000 users: 50% search for products, 20% creating orders of size varying from 2-2000 lineitems, 5% canceling orders, etc.
   - Average think times for each user action specified above.

Outputs:

1. Re-engineered codebase with double the performance/scalability/mttf.
2. Documentation and enhanced test cases.

*Figure 21*

API Fulfillment

Definition:
Given an interface specification, provide the implementation that supports the interface, has full test automation (100% method, 90% line), and has a maintainability index of >=100.

Inputs:
1. Interface definition.
2. Dependencies - codebase and dependent library references (build file if necessary).
3. List of preferred libraries.

Outputs:
1. Implementation files that support interface.
2. Documentation and enhanced test cases.

*Figure 22*

Automated Test Case Creation Service

Overview:

This service is intended to build a set of tests cases that can be run automatically every time a change to the code base is made, to insure functionality has not been broken.

Inputs:

1. A functional map and a set of test cases from Test Case Definition Service. (Figure 34)
2. Instructions how to submit issues, with information on different fields that need to be completed.

Outputs:

1. An automated test suite implementing the test cases checked into source control, and a script to run them.
2. Defects created for failed tests.
3. Report on executed Test Cases (pass/fail, with links to defects of failed tests). Bug reports based on failed test cases should conform to the Bug Fix Service inputs, either via a bug tracking tool (e.g. JIRA) or xls format. (Figure 24)
4. A code coverage report.

*Figure 23*

Bug Fix Service

Overview:

This service is meant to address bugs within an application.

Inputs:

1. Virtual Image reproducing bug environment
   - Includes ability to run debugger against application and update with code changes to validate fix
2. A test suite where a regression test can be added verifying the fix
3. Reproduction of bug
   - Definitive instructions of how to start app
4. Definitive instructions on reproducing bug
   - UI - Screen cast or (worst case) screen shots
   - Command line - File(s) of incorrect and correct output
5. Clear instructions on desired behavior
6. Technical constraints on code (Java version, formatting, etc)
7. An automated test framework must be available.

Outputs:

1. Source code changes in a branch of the source tree
2. If the bug is manifests itself through the UI:
   - A screen cast / screen shot of desired behavior with fix
3. If the bug manifests itself through a Command line:
   - Updated, correct, generated output from the command line being executed
4. Automated regression test that tests the fix

*Figure 24*

Build Management Service - Dependencies

Overview:

This service is meant to take a product code base and revamp how it retrieves dependent libraries required for build, test, and production.

Inputs:

1. Code base and existing build scripts (ant, make, etc)
2. Easily available dependency information
3. Virtual image of the environment

Outputs:

1. An updated set of build scripts that fetch dependent libraries.

*Figure 25*

Build Management Services - Metrics
Overview:

This service is designed to take a product's code base and modify its build system to support generation of some common metrics. These metrics are used to verify that any code changes performed by other services meet certain quality requirements. The build should fail if the metrics fail.

The inputs and outputs are slightly different depending on the programming language used by the codebase.

Inputs:

1. Code base and existing build scripts (ant, make, etc).
2. Virtual image of the environment
3. For each metric, a list of the code that should be excluded from the metric calculation - if any.
4. A checkstyle file to conform to. Java only.

Outputs:

1. A set of build scripts (new or updates to existing scripts) with the following functionality:
    a. Support a target named check-mi that reports MI score, and fails the build if the score is below a certain threshold. Java only.
    b. Support a target named *check-findbugs* that reports Findbugs metrics. Java only.
    c. Support a target named *check-coverage* that reports code coverage, and fails the build if the coverage is below a certain threshold.
    d. Support a target named *check-style* that verifies source code conforms to the given style guide and fails the build if code does not conform. Java only.
    e. Thresholds should be against a file recording previous best score. If the score improves, the file should be checked-out of source and updated.

*Figure 26*

Continuous Integration Setup

Overview:

This service is meant to address the need to get a product into the Continuous Integration environment consisting of Hudson and VMLogix. The end goal is having a setup where a user can specify a branch to build through Hudson. Hudson will kick off the build and VMLogix will provision and start the required virtual machine(s) to actually build the software and run the tests. Hudson will track build progress and collect results for reporting on metrics such as PMD, Findbugs, code coverage, etc.

Inputs:

1. A set of one or more virtual image(s) that consist of the environment the software to be built works in. (e.g. A virtual image of a Windows 2003 Server machine with SQL Server 2000 installed, Tomcat installed, and Subversion installed).
    * The virtual images should support building a version of the product without any user intervention, other than:
        ○ Checking out the specified branch of source code
        ○ Running a specified build script with a specified target (e.g. "ant clean all") that builds the product from scratch and runs tests.
2. A location of the Subversion source, with trunk, tags, and branch layout specified.
3. Specified location of build outputs, where test reporting is placed, PMD scores, Findbug scores, code coverage reports, etc.
4. A login to the Hudson and VMLogix environment.

Outputs:

1. A product configuration in Hudson that kicks of the build through VMLogix (using the configuration listed below) and correctly displays metric reports (in Hudson).
    * We will be using Hudson's distributed build functionality. Each VM Image will need the Hudson 'client' jar installed on it.
    * Hudson should be configured to start the job by telling VM Logix to start it's configuration (provision the VMs, and then starting a script).
    * The goal is all user interaction will be done primarily through Hudson.
2. A VMLogix configuration that correctly provisions the required virtual images and starts the build.

*Figure 27*

Large Use Case Implementation

Overview:

This service is meant to address the need for new functionality of a use case, sized appropriately for 4 weeks of implementation, including testing, debugging, and build work.

Inputs:

1. Use Cases definition.
2. If there are UI components:
   - A visual design (jpg, png, etc).
   - A wireframe design for the use case.
3. VM Image.
4. Existing codebase.
5. Instruction on running existing regression tests.

Outputs:

1. New codebase that meets the specification and passes all existing tests.
2. New automated tests that meets the acceptable coverage requirements over new code
3. Access to a running version of the application for verification of functionality. (Either a URL for web applications or a remote machine login like VNC).

*Figure 28*

Manual Testing Service

Overview:

This service is intended to manually run a set of tests cases on a periodic basis, to insure functionality has not been broken. The unit of bidding will be on a specified number of manual test runs, with the goal being the test runs would all be done within a month time frame. So if a product has on average 9 validation runs a month, the bid would specify 9 runs, and when the product is running out of test runs it should submit a new bid. This service can be combined with a number of Test Case Definitions Service.

(Figure 34)

Inputs:

1. A functional map and a set of test cases from Test Case Definition Service (Figure 34)
2. Instructions how to submit issues, with information on different fields that need to be completed.
3. Please include the number of test cases in the RFP document.

Outputs:

1. Defects created for failed tests
2. Report on executed Test Cases (pass/fail, with links to defects of failed tests)

*Figure 29*

Refactoring Service

Overview:

Given a codebase, refactor it to achieve a Maintainability Index (MI)* of at least 130 with comments and 95 without comments, and it should not cause any change in functionality or performance.

Inputs:

1. Codebase.
2. Regression Test suite.
3. Architectural requirements to satisfy as part of the refactoring (optional).

Outputs:

1. Refactored codebase with no performance degradation and MI value of >=130 with comments and >=95 without comments.
2. Updated test suite.
3. Code Documentation.

*Figure 30*

Scoring Service

Overview:

Input: A data set that contains a number of independent attributes and a 0-1 dependent variable, with 1 indicating a success, and optionally a baseline model that predicts the dependent variable.

Goal: Given a performance threshold equal to the minimum allowable success rate (specified as the number of successes per 100 observations), the goal is to maximize the percentage of records whose average predicted success rate exceeds this threshold. We'll refer to this percentage as the model's performance. The acceptance criterion for this service is defined as creating a model whose performance exceeds the performance of the baseline model plus 5% (or exceeds 25% if no baseline model is provided). To protect against overfitting, we require at least a 0.90 $R^2$ correlation between the training and test data sets (see Outputs below for further details).

Example: Say we have a baseline model and a test data set composed of 20 observations. The model predicts the probabilities of success for these 20 observations as follows: 10.0%, 9.0%, 8.0%, 6.0%, 3.9%, 3.5%, 3.5%, 3.5%, 3.2%, 3.2%, 2.8%, 2.6%, 2.5%, 2.4%, 2.3%, 2.0%, 1.8%, 1.6%, 1.2%, and 1.0%. Additionally, the performance threshold is specified as 8.0 (successes per 100 observations). In this case, the largest subset of records whose average predicted success rate exceeds the threshold is the 4 observations with probabilities of success 10.0%, 9.0%, 8.0%, and 6.0%, for an average predicted success rate of 8.25. In this case, the model's performance would be 20% (i.e. the number of items in the subset, 4, divided by the number of test observations, 20). To meet the acceptance criterion as specified above, a new model must achieve a performance of 25% (20% + 5%) on a randomly held-back test data set.

Notes:

1. The model should be trained on a random sample of 2/3 of the data set and tested on the remaining 1/3. You are expected to ensure that the model is not overfit to the data. We recommend performing cross-validation to ensure a strong correlation between the training and test results.
2. Manipulation of input data is allowed and encouraged (e.g. splitting email address into <username>@<domain> or taking the logarithm of a numeric column).
3. Format validation is also allowed (e.g. adding a column which indicates if the phone number or zip code is well formed).

Inputs:

1. Postgres database hostname, username, password, and schema.
2. Table or view name containing historical observations as rows with attributes and target binary feature as columns.
3. Column name representing target binary feature (vehicle purchased, lead submitted, etc.).
4. Excluded attributes that should not be utilized when creating the model.
5. Model Performance Threshold (i.e. number of successes per 10,000 observations; 8% = 800).
6. Excel description of metadata of the tables (datatypes, constraints, explanation of attributes used,

*Figure 31A* datatypes, etc.).
7. [Optional] Key attributes to be considered during model training. If any key attributes are specified, these attributes must either be a) utilized by the new model or b) specifically considered and rejected by the model.
8. [Optional] A baseline model satisfying the Outputs requirements listed below. The acceptance criterion for this service is defined as creating a model whose performance exceeds the performance of the baseline model plus 5% (or exceeds 25% if no baseline model is provided).

Outputs:

1. A Excel report describing the new model's performance characteristics a. List of all attributes (including any derived attributes) indicating whether each attribute was a) used by the model, b) considered and rejected, c) not considered or d) excluded. Note that all key attributes must be either used by the model or considered and rejected.
    b. Table populated with decile-based breakdown of model performance characteristics (please see the Excel file for details).
    c. $R^2$ calculation comparing decile-based success rates between the training and test data sets
    d. The model's performance value for the held-back test data set 2. An embodiment of the resulting model that is sufficient for the customer to implement and execute the model on a new set of data, such as one of the following:
    a. A PMML description. PMML is the industry standard XML format for predictive models, and is documented at www.dmg.org (any published version is acceptable).
    b. A compilable or interpretable function in any common programming language (e.g. Java, C, C++, SQL, PL*SQL, T-SQL, PERL, Visual Basic, VB Script, JavaScript, .Net, Python, PHP, Ruby, R, etc.).
    c. A textual or graphical representation of the model that completely describes the process for producing a score on each row of data (e.g. an image detailing a decision tree with complete labeling for each branch criteria and bucket score).
3. [Optional] Any additional statistical description or analysis of the new model performance as compared to the baseline model that you believe is relevant.

*Figure 31B*

Small Use Case Implementation

Overview:

This service is meant to address the need for new functionality of a single use case, sized appropriately for 2 weeks of implementation, including testing, debugging, and build work.
If a project submitter supplies the use case in the format below on the wiki, we will support a week of clarification questions in regard to the use case only (not the individual RFP) on the use case pages.

Inputs:

1. Use Cases definition.
2. If there are UI components:
    - A visual design (jpg, png, etc).
    - A wireframe design for the use case.
3. VM Image.
4. Existing codebase.
5. Instruction on running existing regression tests.

Outputs:

1. New codebase that meets the specification and passes all existing tests.
2. New automated tests that meets the acceptable coverage requirements over new code
3. Access to a running version of the application for verification of functionality. (Either a URL for web applications or a remote machine login like VNC).

*Figure 32*

Specification Fulfillment

Definition:
Given a set of software specifications, provide a codebase that meets the specifications. These are projects that right now don't fall into one of the pre-defined service categories.

Inputs:
1. System Requirements Specification (SRS) and Architecture documents.
2. User Interface Specification i.e., Visual design if applicable.
3. Existing tools or codebase if applicable.

Outputs:
1. New codebase that meets the specification.
2. Automated test suite that meets the acceptable coverage requirements.
3. Documentation.

*Figure 33*

Test Case Definition Service

Overview:

This service is meant to address the need of defining useful test cases that cover the functionality of the product. The bidding unit should be at the use-case level. If the application to be tested is a consumer-facing website, we are allowing alternate input from a Use Case.

Inputs:

All Projects require:

1. Any existing application documentation - readme, user documentation, training guides.
2. A description of the Use Cases to test.
   - If there are updated Use Cases, the RFP needs to supply the Use Cases before and after the change, and highlight the changes.
3. If the application is consumer-facing URL availability, the URL can be sufficient input instead of the use case definition(s).
   - The provider is expected to infer functionality from the website directly in this case.
4. Template for Functional Map and Test Cases and existing Functional Map and Test Cases.

If the Use Case(s) are already implemented in the product, these inputs are additionally required:

1. Access to application for test (install image or url and login information).
2. Customer issue/defect system.
3. Instructions how to submit issues, with information on different fields that need to be completed.

Outputs:

1. Created or updated Functional Map.
2. Created and/or updated Test Cases.

If the Use Case(s) are already implemented in the product, these outputs are additionally required:

1. New defects in defect tracking system (or in other specified, well-defined format. i.e. Excel sheet).
2. Report on executed Test Cases (pass/fail, with links to defects of failed tests).

*Figure 34*

UI Fulfillment

Definition:
Given an interface specification, provide the implementation that supports the interface.

Inputs:
1. Interface definition in one of these forms : wireframes, Photoshop documents, or jpeg.
2. Implementation technology - javascript/css, html, ajax etc.

Outputs:
1. Implementation files that support interface.
2. Documentation and test cases where applicable.

*Figure 35*

Use Case Modification (2 week)

Overview:

This service is meant to address the need for incremental functionality of a single use case, where most of the use case functionality is already in product. The change may or may not require UI changes.

Inputs:

1. Use Case definitions before and after the change, and highlight the changes.
2. If there are UI components to the change:
   - A visual design (jpg, png, etc).
   - A updated wireframe design for the use case.
3. VM Image.
4. Existing codebase.
5. Instruction on running existing regression tests.

Outputs:

1. New codebase that meets the specification and passes all existing tests.
2. New automated tests that meets the acceptable coverage requirements over new code
3. Access to a running version of the application for verification of functionality. (Either a URL for web applications or a remote machine login like VNC).

*Figure 36*

Virtual Image Optimization Service

Overview:

This service is meant to address the need to:

1. Get development virtual images (used for projects) correct for development use and optimized for size and speed.
2. Get production virtual images optimized for size and speed.

It is perfectly acceptable to use a software solution such as http://www.invirtus.com/.

Inputs:

1. A virtual image with the set of current setup steps, and information on the running systems.
   - For 'project' virtual images, setup information should already be in the product information pages.

Outputs:

1. A new virtual image with the following properties:
   a. For project images, it should be possible to get a new version of the product up and being tested from source control within 3 hours.
   b. The virtual images should support building a version of the product without any user intervention, other than:
      - Checking out the specified branch of source code.
      - Running a specified build script with a specified target (e.g. "ant clean all") that builds the product from scratch and runs tests.
   c. For production virtual machines, the size needs to be decreased by at least 20%. Any unnecessary processes and services should be turned off.

*Figure 37*

Visual Design Service

Overview:

This Service is meant to address the need of a visual design of an application.

Inputs:

1. Background
   - Details about the industry/domain
   - The current usage of the site/application if it exists in any form
   - User behavior patterns - User expectations, task flows
   - Links to relevant information available online
   - URLs of examples of similar solutions, with explanations of how they are relevant to the requested design
   - Competitive Landscape
2. Target Audience
   - Who are the prime targeted users of this site/application
3. Functional Specification
   - List of pages required
   - Page Descriptions and Features
   - Site Structure (for web applications)
4. Visual Design Specification
   - Branding
   - Tone and Image
   - Color Palette/Scheme
   - Usability
   - Interface Mandatories
   - Accessibility Requirements
5. Interaction Design Specification with wireframes
6. Technical Specification

Outputs:

1. A set of graphic images (either png, psd, jpeg) that implement the requirements

*Figure 38*

Website Prototyping

Overview:

This service allows a prototype web page to be integrated into an existing site quickly. All changes must be limited to one web page and the complexity of the design limited to only allow functionality that could be implemented using DHTML and Javascript. The DHTML and Javascript restriction is only in place to limit the complexity of the features requested in the RFP. You may, at your discretion, use any technologies you wish for implementation.

If the page must display data (i.e. a table or list of search results) this data must be provided as part of the RFP in CSV format. The CSV file should live on the webserver as-is and you must read the data from this file to display it. You may not hardcode the CSV data into your output.

Any data collected by the page can be posted to another URL, but processing or persisting this data is out of scope for this service.

Inputs:

1. Visual design and icons (1 page - multiple views of the same page are allowed) PSD format is preferred, but JPG is acceptable if all icons are made available.
2. A description of the page functionality.
3. Each functional component should be highlighted and its behavior must be explained in the RFP.
4. Screen shot of new or existing links that should navigate to the new page and destination URLs for links on the new page.
5. CSV file with any data required by the page.
6. A VMWare image of the existing site, along with any passwords and access permission required. The image must contain a full development environment.
7. Instructions on how to access the website site in the VMWare image.
8. A repeatable build and deploy process from the SVN source.

Outputs:

1. A URL to a running website that includes the integrated visual design. This URL must be available for 14 days after delivery for accepted projects. Clicking on the URL should display the homepage of the site.
2. New or changed files checked into the given SVN repository. Following the subversion process in [Subversion Process]

*Figure 39*

SYSTEM AND METHOD FOR OUTSOURCING PROJECTS

CROSS-REFERENCE TO RELATED APPLICATION

This application claims the benefit under 35 U.S.C. § 119(e) of U.S. Provisional Application No. 60/895,267, filed Mar. 16, 2007, entitled "System and Method for Outsourcing Projects," and is incorporated by reference in its entirety.

BACKGROUND OF THE INVENTION

Field of the Invention

The present invention relates in general to the field of information processing. In one aspect, the present invention relates to a system and method for outsourcing projects.

Description of the Related Art

In the face of increasing global competition and under the constant pressure to lower costs, many companies have turned to offshoring and/or outsourcing projects, such as software development. Offshoring is moving to a captive office in another country (for example, India or China), while outsourcing refers to using different partners around the globe to do work, such as, for example, commodity-type work.

With offshoring, offices are relocated and formed so that the company owns the management structure and the daily running of the office to achieve cost benefits. But even after doing offshore co-location, a company has a need for work that needs to get done by third parties. That is where outsourcing applies. There are companies which are basically called factories, that is, they just have many developers whose job is to write code. There comes a point when the company decides to focus on its own competencies and wants to take advantage of this massive code factory, which is available around the globe because coding is becoming a commodity. The offshoring mode often occurs for a variety of reasons, such as when the company cannot trust someone else to develop a solution, so the company sets up its own structure, etc. based on its knowledge of the processes and the caliber of talent required.

A traditional outsourcing model is commonly referred to as the time and material model. That is, the company gets a contractor, and the company pays the contractor based on the number of hours he or she has worked. When paying on an hourly basis, the company does not get the benefits of efficiency because it is in the vendor's interest to spend 20 hours instead of 10 hours since he gets paid more. With the time and material model, there is no mechanism in the system which allows the company to get efficiencies.

If the company does not like the time and material model because the company believes that the vendor is stretching working hours just to get paid more, an alternative approach to hit margins is to obtain a guaranteed contract. With a guaranteed contract (e.g., for 2 to 3 years), the vendor/contractor may discount a percentage D on the monthly rate instead of charging on a full hourly basis. For example, the vendor/contractor may give the company a volume discount in a contract under which the vendor/contractor hires 20 people over the next 2 years, and the vendor/contractor gives the company a quote for 2 years at a flat rate per month. This model is typically called a global operating center (GOC) or some other term which uses an outsourcing partner as a center of excellence. However, there is no flexibility in such a model to address situations where the company is not satisfied with someone, or for replacing a person at the vendor/contractor who is terminated.

As seen from the conventional approaches, a need exists for methods and/or apparatuses for improving the efficiency and quality of outsourcing projects. Further limitations and disadvantages of conventional processes and systems will become apparent to one of skill in the art after reviewing the remainder of the present application with reference to the drawings and detailed description which follow.

SUMMARY OF THE INVENTION

In at least one embodiment, a system and method allow projects, such as software development projects, to be efficiently outsourced. The projects can be specified using discrete service identifiers. The input and output of each service is capable of being objectively identified, and objective evaluation metrics can be linked to each service. The objective evaluation metrics allow for each project to be evaluated using, for example, automated evaluation software tools. The precise definition of discrete services also facilitate accurate and complete request for proposals (RFPs) using, for example, only one page of text.

Additionally, in at least one embodiment, projects can be posted on a web site for bidding by third parties. The projects preferably have completion deadlines of 4 weeks or less. Such short timeline projects allow the projects to be concisely described, results returned quickly, shortened evaluation duration, and payment within a normal monthly cycle. Since the projects are associated with a discrete service with objective inputs, outputs, and evaluation metrics, vendors can bid on the project with minimal evaluation and speculation regarding the appropriate bidding price for the project. Additionally, since each service has specific inputs, outputs, time line goals, and prices, contracts for each project can be easily configured using data based upon the winning bid, i.e. time line and price, and the specific service identified with the project.

The system and method for outsourcing projects can be used by a company to outsource their own projects and/or can be offered as a service to other companies as consumers to facilitate outsourcing of the consumers' projects.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts motivations for outsourcing.

FIG. 3 depicts an outsourcing strategy for use with the system and method for outsourcing projects.

FIG. 5 depicts an overview of discrete outsourcing services.

FIGS. 6-12 depict exemplary, respective discrete services that can be used to efficiently generate an RFP, develop a bid, and evaluate a completed project.

FIGS. 13-18 depict exemplary screen shots illustrating an example outsourcing network for generating and viewing RFPs, bids and awards.

FIGS. 21-39 depict another exemplary set of discrete services that can be used to efficiently generate an RFP, develop a bid, and evaluate a completed project.

DETAILED DESCRIPTION

Figure 1:
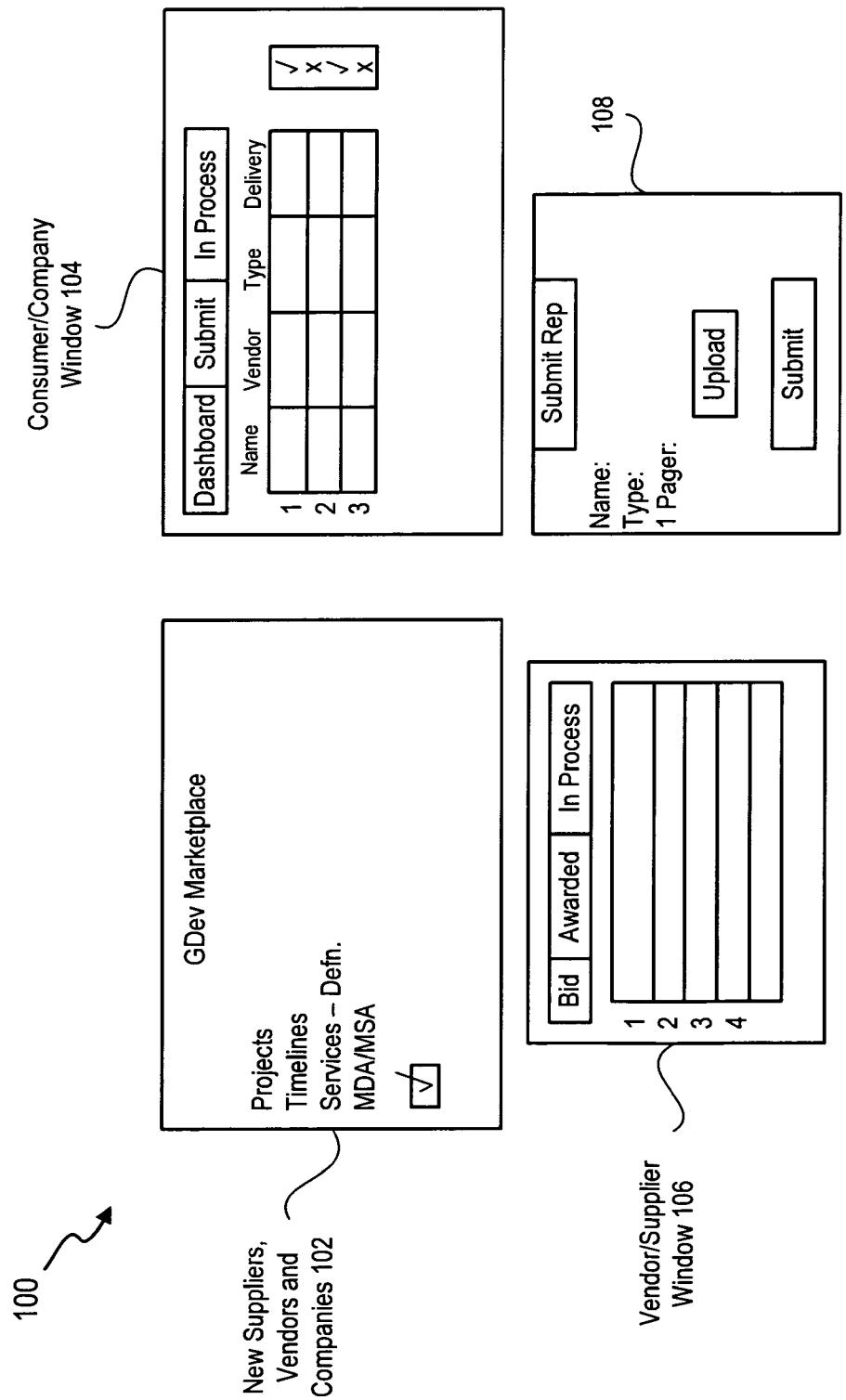
FIG. 1 depicts a system and method for outsourcing projects.

An efficient outsourcing system, method and apparatus are described for efficiently generating requests for proposals (RFPs) using predefined service identifiers which each specify a discrete, short-term project with fixed inputs and outputs and objective evaluation metrics. To simplify the process of submitting and evaluating RFPs, the RFP documents are structured to follow a predetermined format by using discrete service identifiers for specific technology areas in which the identified service is easy to specify, easy to define, easy to evaluate, and easy to measure results. By emailing, posting or otherwise distributing the RFPs, qualified vendors are invited to submit bids in an electronic marketplace within a defined timeframe so that the company submitting the RFP can award the RFP to one or more of the vendors who submit a winning bid that meets one or more acceptance criteria defined by the company. Vendors are encouraged to acquire expertise in the technology areas relating to specific service identifiers by providing the vendors with the opportunity for high volume, repeat business in these technology areas.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Companies want flexibility, high quality deliverable, full coverage across all the work to get done, all at the best price available. These are the desirable basic tenets of outsourcing. Companies don't want to be held into long term contracts. A system and method of outsourcing allows for an identification of the basic characteristics of a service that a company wants to outsource, which would make the outsourced project fit these tenets. In at least one embodiment, there are three main things that a company wants to accomplish, which would keep partners happy, because finally if the company does not want to give someone a long term contract, there has to be a different way for that vendor (also sometimes referred to as a supplier, provider, etc.) also to make money. Like in any outsourcing relationship, the company wants to get the cost benefit, but the vendor also has to make his money somewhere. RFQs or RFPs, which is a request for proposal (sometimes called RFIs, request for intent) (collectively, "RFP") identify work.

One problem is that the RFPs can vary in a virtually unlimited number of ways and subject matter domains. Technology often requires very specific knowledge. That is why the company wanted captive units, because of very specific technology domains, such as automotive domain, sometimes a very specific insurance domain, or a computer industry domain. It is very difficult for vendors to switch domains day in and day out if the RFPs don't follow a certain pattern or a certain format. So the first tenet, is: services should be easy to specify, easy to define, easy to evaluate, and easy to measure results. For example, in at least one embodiment, if an RFP cannot fit on one page, then something is wrong. That means the problem is too large. An RFP should also be defined for a fixed, short project completion time. For example, typically one RFQ over a four week delivery timeline often works well. Obtaining results in a short time period, e.g., every 4 weeks, is very easy to monitor, is very easy to piece projects together, and the second benefit again that companies get is companies cannot paralyze the effort for 1 to 3 months. Companies can develop RFPs for three different windows in four week chunks and get everything back in one month. If the company wants a short cycle, the second tenet is measurability. To have short cycles, projects should be very easy to measure and accept because if the company cannot measure projects easily and the projects take the companies a disproportionate amount of time, e.g., 1 or 2 months more to validate, then the company loses the benefit of a four week cycle.

The output of a project performed by outsourcers is measured by a specification provided. So a user of the system can specify and define, easily measure, and accept projects. The third tenet is the repeatability and the volume of the service. Because if again an outsourcer doesn't have sufficient volume, then why would the outsourcer have interest in working with no guarantees and no long-term contracts. Two examples explain all three tenets. So the first thing the company realizes is for any product in the organization, most of the customers, or most product managers, the first few things they want to get done is apart from new features, everybody wants the product to run faster. If the company's previous engine took two hours, it would be great if it took 1 hour now. Everybody wants it to take less memory. The code should be leaner to run on less memory.

The project should be more scalable. If it's a website, if it could only handle 50 users, if the business has grown, I want it to handle 200 users now. So no new features, but if you improve a product on these three dimensions, that is, performance, memory, and scalability, your end consumer is always happy. So, the system can allow a user to select the service that the outsourcer will perform. The service is not specific to automotive, or insurance, or anyone.

FIGS. 5-12 depict exemplary, respective discrete services that can be used to efficiently generate an RFP, develop a bid, and evaluate a completed project. The first service selection illustrated by way of example in FIG. 6 is a double-double-double service, where a double-double-double service is basically requiring that performance be doubled in three dimensions, such as making it faster by 2 times, halving the memory, and doubling the number of users who can concurrently use the program (e.g., doubling the scale). Double-double-double is very easy to specify because the product is known and current performance is known, so the service can be easily specified in one page for this is the product. It should not change what the product does, if the product transferred A to C, the program still translates A to C. So, if A to C was done in 2 minutes, the company wants it done in 1 minute now. So, very easy to specify, people understand it, does not require back and forth communication because the performance can be objectively quantified to measure. If two minutes becomes 1 minute, then the company knows the outsourcer met the goal. So that's easy to measure. The company can use the system to select a double of product on the performance dimension. When the code is returned by the vendor, the company can select halving the memory requirement dimension. Later, the process can be repeated as many times as the company wants until the company reaches a natural barrier. The point being that if a vendor decides to invest in the service, the skill set required for doing it again is all the same. So though there are no guarantees, it is in the best interests of the vendor, once a vendor has a defined skill set, the vendor becomes an aggressive bidder because the vendor wants that skill set to be reused at the same talent level rather than on something different. So that is an example of one service.

In at least one embodiment illustrated by way of example in FIG. 8, another service offered by the system is called refactoring, which improves the code quality by a measurable amount. For example, if a company acquires products which do not meet quality standards, the company has many products to improve the quality on. The third tenet of volume and the first tenet of easy to specify in a one page specification is met because this is a product to improve the quality. Quality is generally considered subjective. However, new tools are now available to objectively measure quality. For example, the Software Tool Institute from Carnegie Mellon, has tools for measuring software quality called maintainability index (MI). The MI ranges from 10 to 150. The higher the MI, the higher the quality. Thus, the MI can be measured with the system in an automated fashion on the entire code basis. The particular MI is a matter of design choice and can be set, for example, at 100 or varied from project to project.

Another example of a discrete service is a code coverage service illustrated by way of example in FIG. 7. With a code coverage service, a given codebase is used to build a set of automated test suites that meet, for example, 100 percent method and 90% line coverage for the code base. Thus, the objective measurement is 90+, or the company can make it 80, 70, or any other value. But again, that gives the flavor of around what the outsourcing services are. So, in at least one embodiment, services have volume, ease of definition, and ease of measurement.

Another example service offered by the system and illustrated by way of example in FIG. 9 is the product support service which provides production support services for a given application/codebase/website and a specified access to a hosting infrastructure. With the production support service, the inputs are specified by identifying an application, codebase, and/or website. In addition, the access to the hosting infrastructure is also specified as an input, as is the service level agreement (SLA) which defines the run book, monitoring requirements and escalation points. The outputs for the production support service are the production support and management of the hosting infrastructure for the application/codebase/website, which must adhere to the SLA requirements (e.g., uptime, performance, bandwidth, etc.).

FIG. 10 illustrates by way of example an API fulfillment service offered by the system which provides, for a given interface specification, the implementation that supports the interface having full test automation (100% method, 90% line coverage) at a maintainability index of at least 100. With the API fulfillment service, the inputs are specified by identifying an interface definition, any dependencies (e.g., codebase and dependent library references (which may require that a file be built), and a list of preferred libraries. The outputs for the API fulfillment service are the implementation files that support the defined interface and any documentation and enhanced test cases.

FIG. 11 illustrates by way of example a user interface fulfillment service offered by the system which provides, for a given interface specification, the implementation that supports the interface. With the user interface fulfillment service, the inputs may be specified by identifying an interface definition in one of three forms: wireframes, photoshop documents or JPEG files. In addition, the implementation technology (e.g., javascript/css, html, ajax, etc.) is also specified as an input. The outputs for the user interface fulfillment service are the implementation files that support the defined interface and any documentation and applicable test cases.

FIG. 12 illustrates by way of example a specification fulfillment service offered by the system which provides, for a given set of software specifications, a codebase that meets the specifications and that do not otherwise fall within a predefine service category. With the specification fulfillment service, the inputs are specified by identifying the system requirements specification and architecture documents, the user interface specification (e.g., visual design if applicable), and existing tools or codebase if applicable. The outputs for the specification fulfillment service are the new codebase meeting the specification requirements, an automated test suite that meets the acceptable coverage requirements and any documentation.

Using discrete services such as exemplified by the foregoing, the system enables the development capacity to increase by creating RFPs that are easy to understand, easy to specify, and easy to consume. For example, consider the example of a company that builds microsites for OEMs. In this example, if OEM A is launching a new model X, the company builds a website which is a marketing website only for the new model. By simplifying all these constraints and quantifying them with a series of RFPs using objectively defined services, the system allows a company to get a project to work and work better. To get the best price for the service, the company sets a deadline for submitting bids and a time to respond to bids. One thing is clear, this system and method are a new model in the marketplace. As previously discussed, most vendors fall in one of two models. One is the time and material model with staff augmentation where the vendor will give the company an individual and the vendor will bill the company by the hour. That is the way most outsourcing projects work. And the second model is where the vendor will be a captive provider, so the vendor will give the company the volume discount if the company will give the vendor either the volume or a long-term contract.

Referring to FIG. 1, the system 100 can include a website that automates vendor qualification, RFP sending, RFP reply tracking, RFP award, project tracking, product delivery, product testing, product acceptance, and product integration. The system 100 can also include user selection options that allow the user, for example, to specify a discrete service type, such as double-double-double. By selecting the service type and completion timelines, once an RFP reply is accepted, a service contract can be automatically generated with all necessary contractual terms by configuring the contract using legal language modules that can be automatically modified to reflect the particular agreed upon project details. The system 100 for outsourcing projects can be used by a company to outsource their own projects and/or can be offered as a service to other companies as consumers to facilitate outsourcing of the consumers' projects.

The system 100 allows a vendor to log in, see a dashboard indicating project awards and non-awards. The vendor can see lost projects, including the lowest price. For example, the company lost this bid because the vendor bid at $6,000 and the lowest price was $3,000. The system can share data, such as the lowest price, for a feedback loop. The system wants this whole loop to close out because the closed loop model is a mutually beneficial model because the company receives the cost benefit and vendors see the pipeline and the work. Vendors can decide how best to change their pricing to keep a longer relationship with the company. The cycle of sending RFPs can occur on a regular basis, for example, repeat every week. Thus, the generation of work measurable by quantifiable, objective measurement technology is ongoing. A four week turn around works well because vendor do not have to wait too long to receive payment and, with a week project acceptance period adds only 15-16% time overhead. In some business cases, 4 weeks is too long, the company wants things faster. Four week projects tend to result in faster, quicker work, and the short timeline improves the chance of succeeding by the vendor.

Whenever the company accepts a bid, there is already a pre-existing general contract that they are operating under. There are types of contracts. So by performance or double-double-double one, obviously the goal is to get double the performance, half the memory, but at times the company also finds the vendors are able to get the company 30% improvements. So the system structures those contracts on a deal based structure. So, in at least one embodiment, the system has one contract, e.g., a double-double-double type contract, and standard double-double-double contract provisions are accessed, and made electronically or manually available to the winning vendor for acceptance. Thus, the particular service requested is linked to a particular type of contract for automatic contract configuration.

System 100 provides a marketplace 102 that allows projects, services (e.g., double-double-double, code coverage, etc.), Master Development Agreements/Master Services Agreements (MDA/MSA), and timelines to be viewed by new suppliers, existing vendors and companies seeking vendors or suppliers. As depicted, the system has consumers, such as a business unit or company. In addition, each consumer company has vendors or suppliers. In operation, the consumer company submits an RFQ or an RFP. The consumer company makes an option of what type it is, double-double-double, code coverage, etc., by uploading the type of service. Since the services are well-defined with objective goals, they can be identified in a very short document, e.g., one page. The consumer dashboard 104 displays a consumer company's recently-submitted projects (e.g., within the last two weeks, months, etc.), comments on delivery, feedback, and a feedback loop. In the vendor display window 106, vendor suppliers access the system 100 and see the projects available for bidding, choose a project, submit a bid price, choose another project, submit a price, etc. Then the vendor suppliers will view the vendor display window 106 to see what projects are awarded to them, what projects are in progress, and what projects are they ready to start delivering on. In the management interface 104, the consumer company can see a dashboard of how the projects are going, and where the projects are, how many successes and failures in these areas, etc. In this way, the vendor suppliers and consumer company interact through the display 106 and dashboard 104 to create a marketplace.

The system 100 can present, in at least one embodiment, a quick screenshot of consumer information and vendor information. The consumer will see bid and award-related information in the window 104, using the dashboard, submit, and in process links. The dashboard link provides a view of all the projects, 1, 2, 3, including name, vendor, type, delivery date, and success or failure information. When a vendor logs in, a vendor sees window 106, which is all the projects open for bidding, and the vendor can choose to go and bid on any project using the Bid link. Vendors will have another view in the "awarded" link which displays all the projects awarded to the vendor. And at the "in process" link, the vendor sees which projects are in process, which are the projects the vendor will be or is working on.

In window 108, the company can upload the project code. Then the company would have something that provides some sort of data that would accompany the contract that says this is a double-double-double project. In at least one embodiment, when a vendor gets awarded a project, the vendor would automatically get a snapshot of the code base from a repository. So he may be modifying existing code or he's learning from that. The vendor uploads completed code. The system tests the code in accordance with the type of service associated with the code. For example, for a double-double-double project, the system will automatically take the new code, measure the timing of the old code, and the new one, and show that this will pay if the code, for example, runs in half time. So basically the company knows what type of project, the company knows the metrics that they have to meet. The vendor can upload the completed project code. If the code passes the test identified in the service linked to the bid, e.g. double-double-double, then the vendor fulfills the terms of the contract and receives agreed upon compensation. If the code does not pass the test, then the system 100 can allow remediation for a limited amount of time. Alarms can be set to alert the consumer and/or vendor of upcoming and/or pending deadlines.

With the system 100, the company can make the code and RFP available for bidding on the system web site, along with all the data that is necessary to bid on it. Once bids are submitted in response to the RFP, the company can decide which bid the company is going to accept using any desired rule to control how the company will accept an RFP. In addition, the company can have a manual or automatic way to track project progress and track who has which project and which code.

FIG. 2 depicts a variety of motivations for outsourcing projects, such as software projects. As depicted, outsourcing has become more common as software technology has become commoditized in response to pricing pressures created by increased global competition and the constant pressure to reduce costs by using less expensive programming sources, such as local experts, offshore experts and outsourcers. Offshoring is often used as a strategy to reduce costs by using cost-effective offshore technical talent as team members from such countries as India and China. However, outsourcing can provide additional savings by using competitive bidding between "code factory" vendors that are able to produce high volume coding at low cost.

FIG. 3 summarizes an exemplary outsourcing strategy for use with the system and method for outsourcing projects. As depicted, the outsourcing strategy defines RFPs using predefined services that are easy to specify or define, easy to measure and highly repetitive in terms of the volume opportunities provided to vendor suppliers. By defining service requirements with a one-page summary, the service characteristics for an RFP may be readily specified and evaluated by potential bidders. In addition, the use of objective, easily measured metrics (e.g., 90% code coverage, MI of at least 100, half the memory, etc.) to define the RFP requirements allows the performance requirements for an RFP to be readily ascertained. Finally, by including an opportunity for high volume projects which are repeatedly submitted, vendors are incentivized to build an expertise over time in the project area. By using predefined services having these characteristics, the outsourcing process may be formalized with a services model whereby appropriate outsourcing tasks are carefully defined with the predefined services as RFPs to establish a marketplace for competitive bidding to achieve lower costs, albeit with a sufficient amount of bid awards in a project area (e.g., on a weekly basis) to keep vendors interested in the services model.

Figure 4:
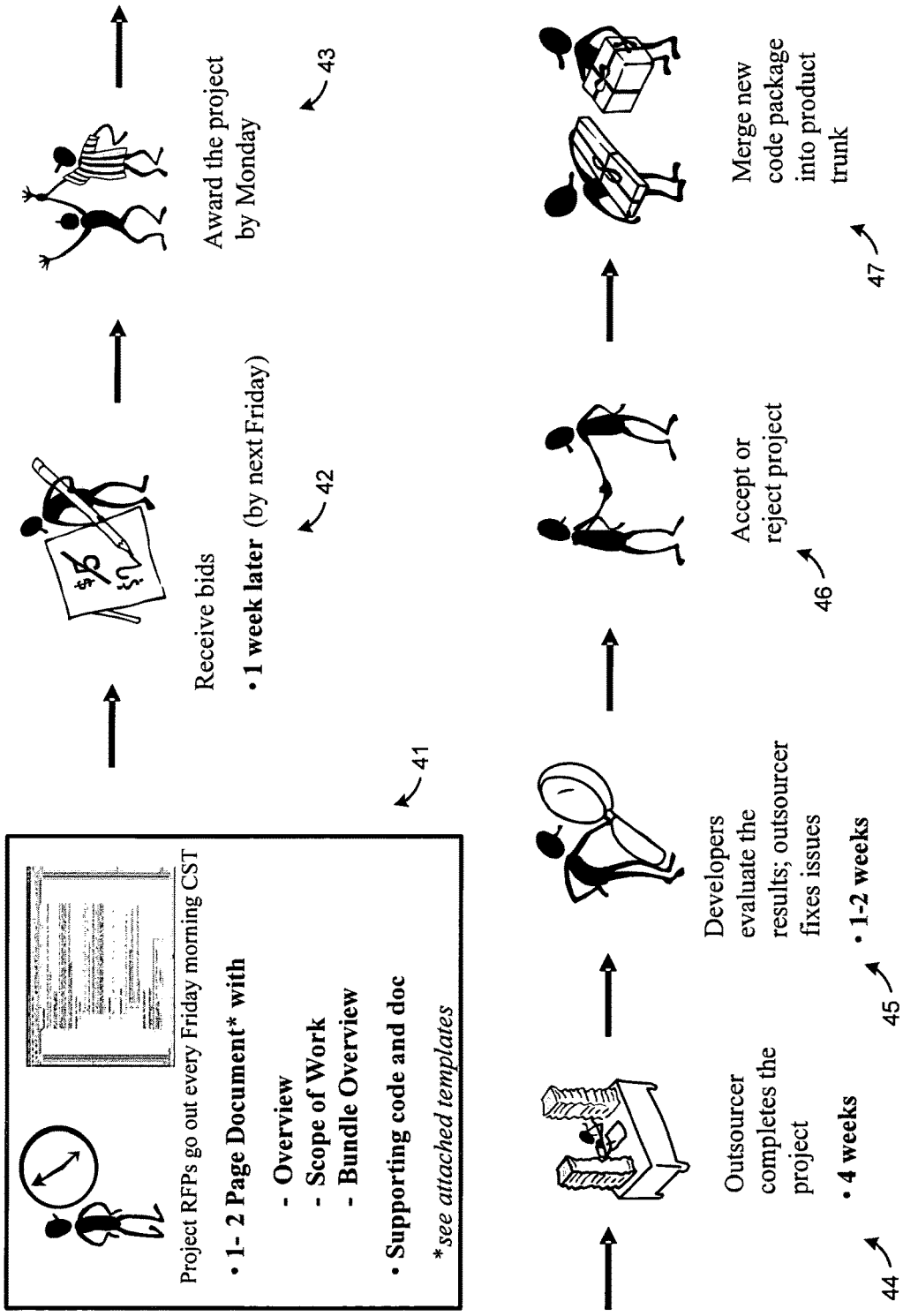
FIG. 4 depicts an exemplary timeline for outsourced projects.
Figure 13:
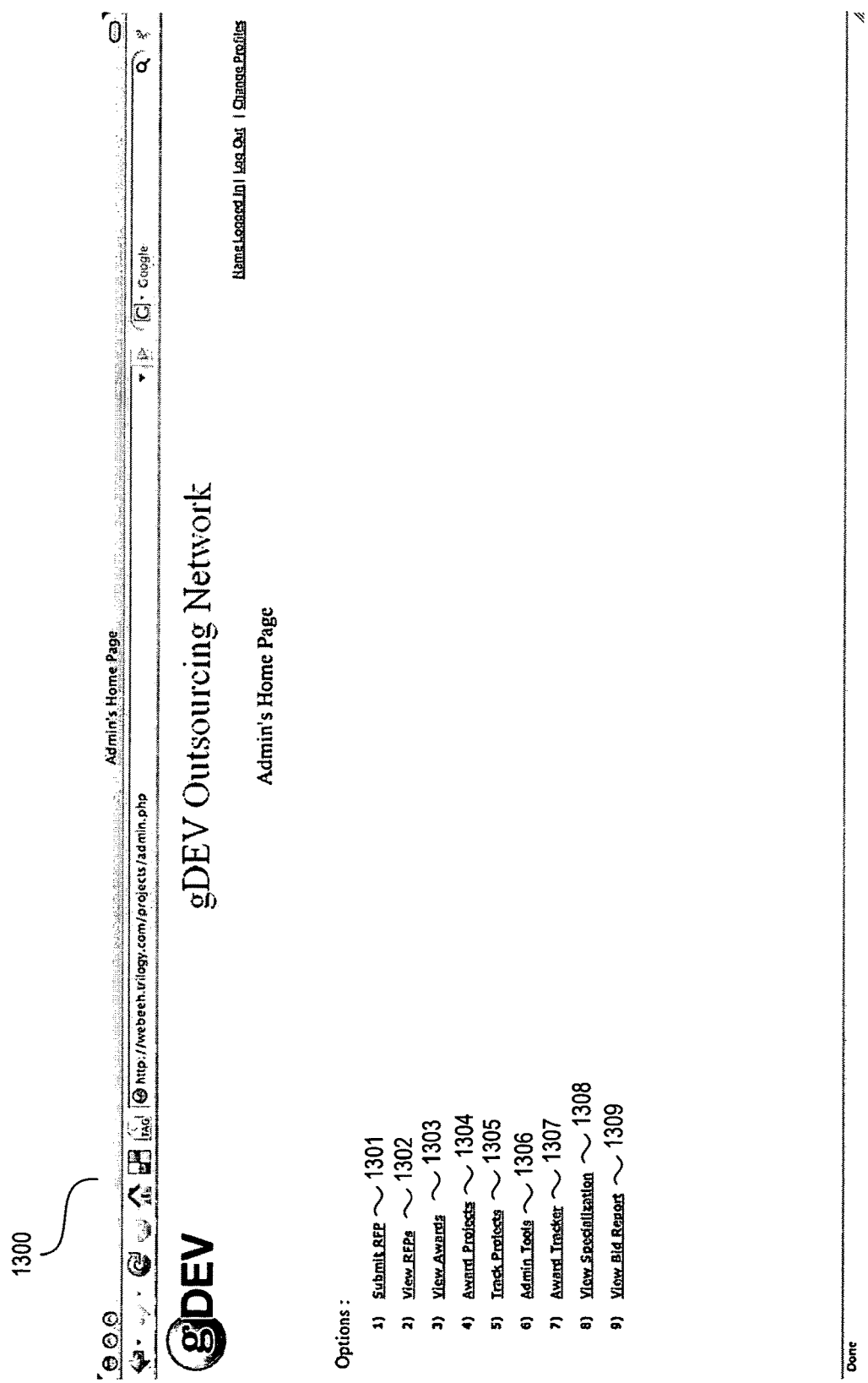

FIG. 4 depicts an exemplary outsourcing process and timeline for outsourced projects. As depicted, the system sends an e-mail to potential vendors with one or more RFPs and any supporting code or documentation at stage 41. For example, the system may be used to send an email which goes out which would list 20, 40, 60, 75 RFPs to give a vendor a view of the company's weekly pipeline of RFPs so that when the vendors receive these emails, the vendors know that the timer starts so that, by a specified date (such as one week after sending the e-mails), the vendor needs to submit bids (stage 42) which have everything in place for the company to make the decisions awarding projects (step 43). The company also may have types of projects in terms of normal process, critical, etc. So, in at least one embodiment, some service types can be auto-awarded to a vendor at a specified price without competitive bidding. Kind of a "buy now" option. In essence, the company makes an offer ready for acceptance. There's no negotiation on that, there is no bidding on that, in a specified price the company is requesting work for a specific business need. The company is willing to pay that much and typically these prices are aggressive because the company wants completion in an accelerated time period. The system can have a separate In Box which tracks RFP replies or offer acceptances. The system typically tracks by project how many vendors bid, what their bidding price was, and generates a report for presentation to a user, such as the company outsourcing the project. If the system receives multiple bids by qualified partners where they all qualify, then the company can select, for example, the cheapest one, the most cost-effective. If the system has bids with one qualified partner and 2 or 3 new vendors who are bidding, then the new vendor will be awarded a contract, for example, only if the new vendor's price was significantly cheaper. The evaluation process can be a manual or automated. Once the awarded vendor completes the outsourced project (stage 44) and the results are evaluated and fixed (stage 45), the company accepts or rejects the project (stage 46), and any accepted project code is merged into the existing product trunk (stage 47).

To illustrate how qualified partners may be used to define mini-networks of vendor suppliers that are specialized in specific technology or service areas, reference is now made to FIGS. 13-18 which depict exemplary screen shots illustrating an example outsourcing network for generating and viewing RFPs, bids and awards. As a preliminary matter, the example outsourcing network uses an administrative home page or website 1300 to establish an entry point for a company and its vendors to automate submission of RFPs (through link 1301), viewing and reply tracking of submitted RFPs (through link 1302), viewing of awards (through link 1303), awarding of RFP projects (through link 1304), project tracking (through link 1305), administrative functions (through link 1306), award tracking (through link 1307), vendor qualification (through link 1308), viewing of bid reports (through link 1309). The outsourcing network can also include user selection options that allow the user to monitory product delivery, product testing, product acceptance, vendor qualification, and product integration. Thus, the administrative home page or website 1300 can be used by a company to outsource their own projects and/or can be offered as a service to other companies as consumers to facilitate outsourcing of the consumers' projects.

With the "Submit RFP" link 1301, the outsourcing network may include user selection options that allow the user, for example, to specify a discrete service type, such as the bug fix service is used to address bugs within a specified application. With the bug fix service, the inputs may be specified by identifying a virtual image that reproduces the bug environment, a test suite where a regression test can be added verifying the fix, a reproduction of the bug (including definitive instructions of how to start the application), definitive instructions on reproducing the bug (e.g., with screen shots and/or command lines), clear instructions on the desired behavior, technical constraints on the code (e.g., Java version, formatting, etc.), and an automated test framework. The outputs for the bug fix service are the source code changes in a branch of the source tree; a screen shot of the desired behavior with the fix if the bug manifests itself through the user interface; an updated, correct, generated output from the command line being executed if the bug manifests itself through a command line; and an automated regression test that tests the fix. Since the services are well-defined with objective goals, they can be identified in a very short RFP document, e.g., one page.

Figure 14:
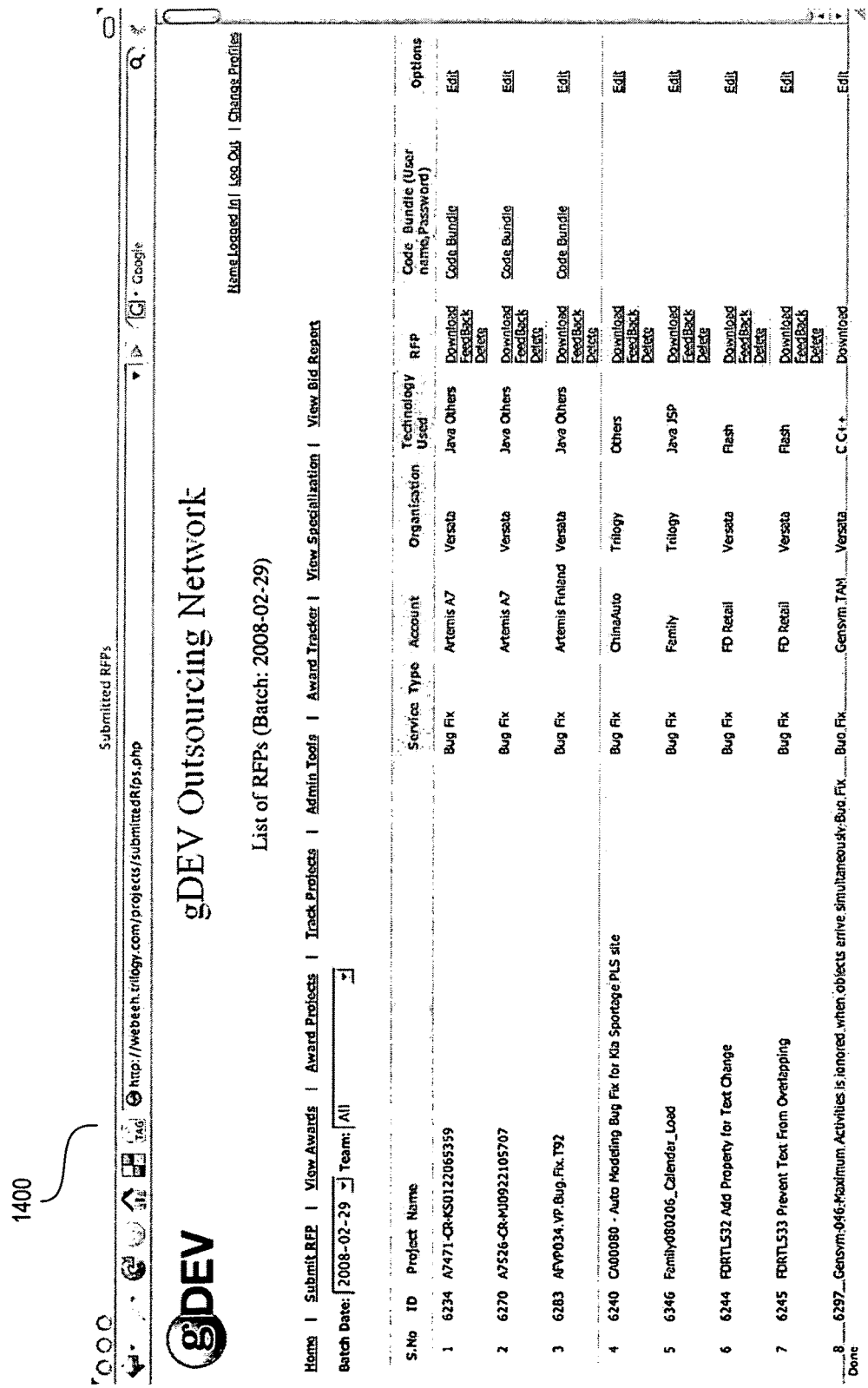

With the "View RFPs" link 1302, the outsourcing network generates a dashboard display 1400 as illustrated by way of example with FIG. 14. The dashboard display 1400 may display a consumer company's recently-submitted project RFPs (e.g., within the last two weeks, months, etc.) which are identified by ID and project name 1401. Each displayed project includes an identifier of the service type 1402 used to create the project RFP (e.g., Bug Fix, Double-Double-Double, etc.), an identification of any required code bundle information 1404 associated with the project RFP, and any other identifying information for the project RFP (e.g., account, organization, technology used, etc.). The dashboard display 1400 may also include an RFP comment field 1402 for comments on delivery, feedback, and a feedback loop.

Figure 15:
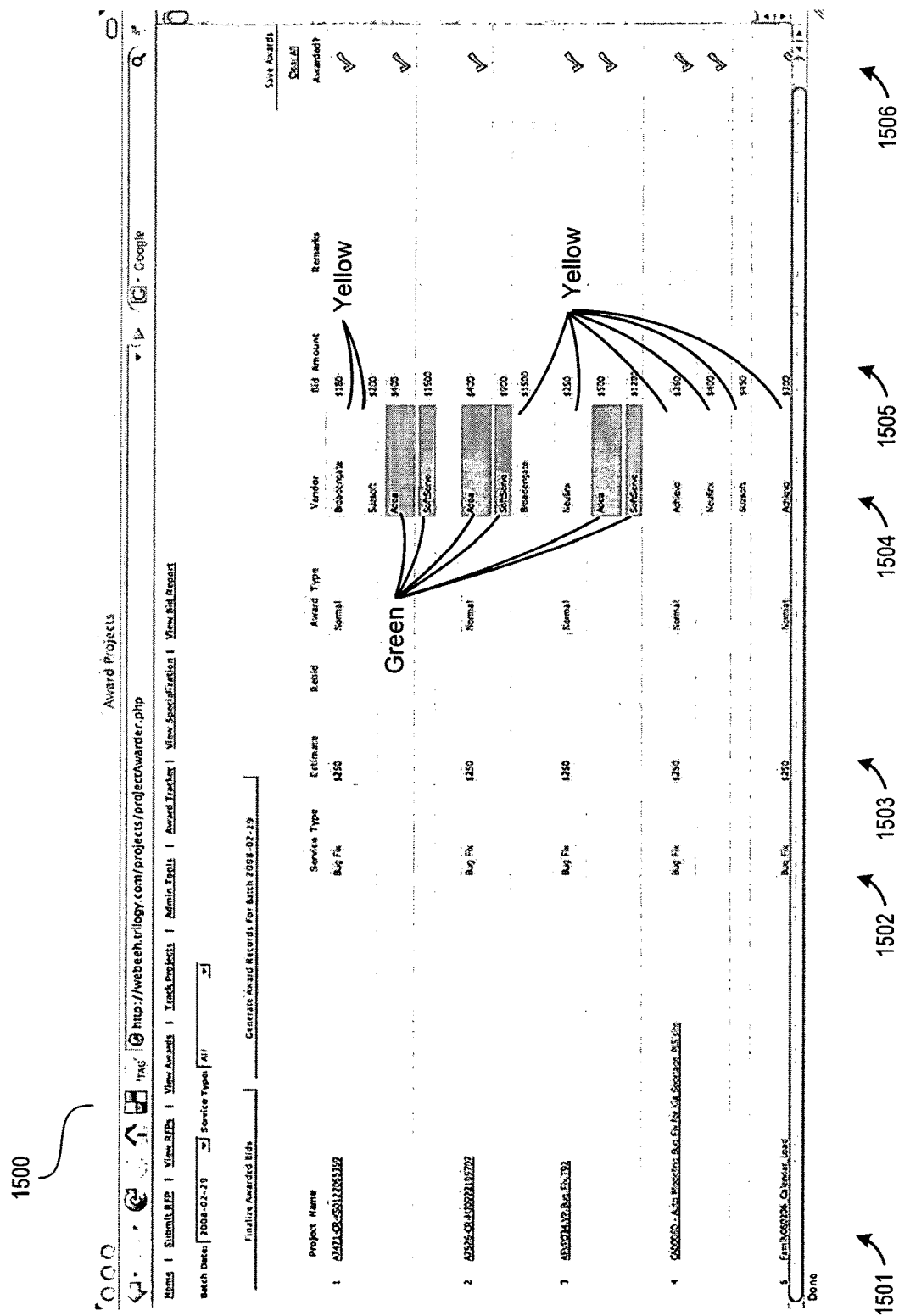

With the "Award Projects" link 1304, the outsourcing network generates an award selection screen or web page 1500 which lists one or more RFP projects (e.g., 1-5) that have been submitted for bids, as illustrated by way of example with FIG. 15. As depicted, the selection screen 1500 may include, for each RFP project, the name of the RFP project 1501, an identifier of the service type 1502 used to create the project RFP (e.g., Bug Fix, Double-Double-Double, etc.), and an indication by the consumer company of the estimated cost and type of award 1503. The selection screen 1500 also displays a list of vendors 1504 that have submitted a bid in response to the project RFP, along with the corresponding vendor's bid amount 1505. With the selection screen 1500, the consumer company can see all submitted bid information, including the lowest price, and can use this information to select a bid using the bid award field 1506. For example, with the second project (A7526-CR-MJ0922105707), the Adea vendor is awarded the bid because the Adea vendor's bid at $400 was the lowest submitted bid price.

To assist with the award process, the list of vendors 1504 may include a visual indication for each vendor as to whether the vendor has been qualified as a specialist by the consumer company. In selected embodiments, an individual vendor may be qualified as a specialist in a specific technology area that corresponds to one of the discrete service identifiers by acquiring a predetermined amount of experience, efficiency or expertise in the specific technology area. Each consumer company may establish its own criteria for qualifying a vendor as a specialist in a specific service area so as to assure that bids from such specialists will be realistic bids that are based on actual experience and/or expertise in the service area. By qualifying vendors as specialists in different service areas (e.g., as Bug Fix specialists or Double-Double-Double specialists), the vendors becomes more efficient in the designated area of specialization, which thereby reduces vendor costs and vendor bid prices. Once a vendor is qualified as a specialist for a particular technology area, the vendor's name appears in the outsourcing network with a visual indication that the vendor is a specialist. For example, in the award selection screen 1500, the listed vendors 1504 that are qualified as specialists for the "Bug Fix" service (Adea, SoftServe, E Soft, Atlas, and FCG) are displayed with a first visual indication (e.g., green highlighting), while the other listed vendors 1504 that are not qualified as specialists (e.g., Broadengate, Suzsoft, and Neulinx) are displayed with a second visual indication (e.g., yellow highlighting).

By visually segregating the qualified specialist vendors from the non-specialist vendors, the consumer company may choose to award projects to only qualified specialist vendors. Alternatively, the consumer company may choose to award the project to two different vendors so that both a qualified specialist and a non-specialist vendor are given an opportunity to be evaluated on the project. For example, with the first project (A7471-CR-KS0122065359), the bid award field 1506 shows that Adea is awarded the bid because the Adea vendor's bid at $400 was the lowest submitted bid price from a specialist vendor. However, the bid award field 1506 shows that Broadengate is also awarded the bid as the lowest price bid ($180) from a non-specialist vendor. With dual awards, the risk that the much cheaper bid from Broadengate won't be successful is covered by also selecting the lowest price specialist bid from Adea.

Figure 16:
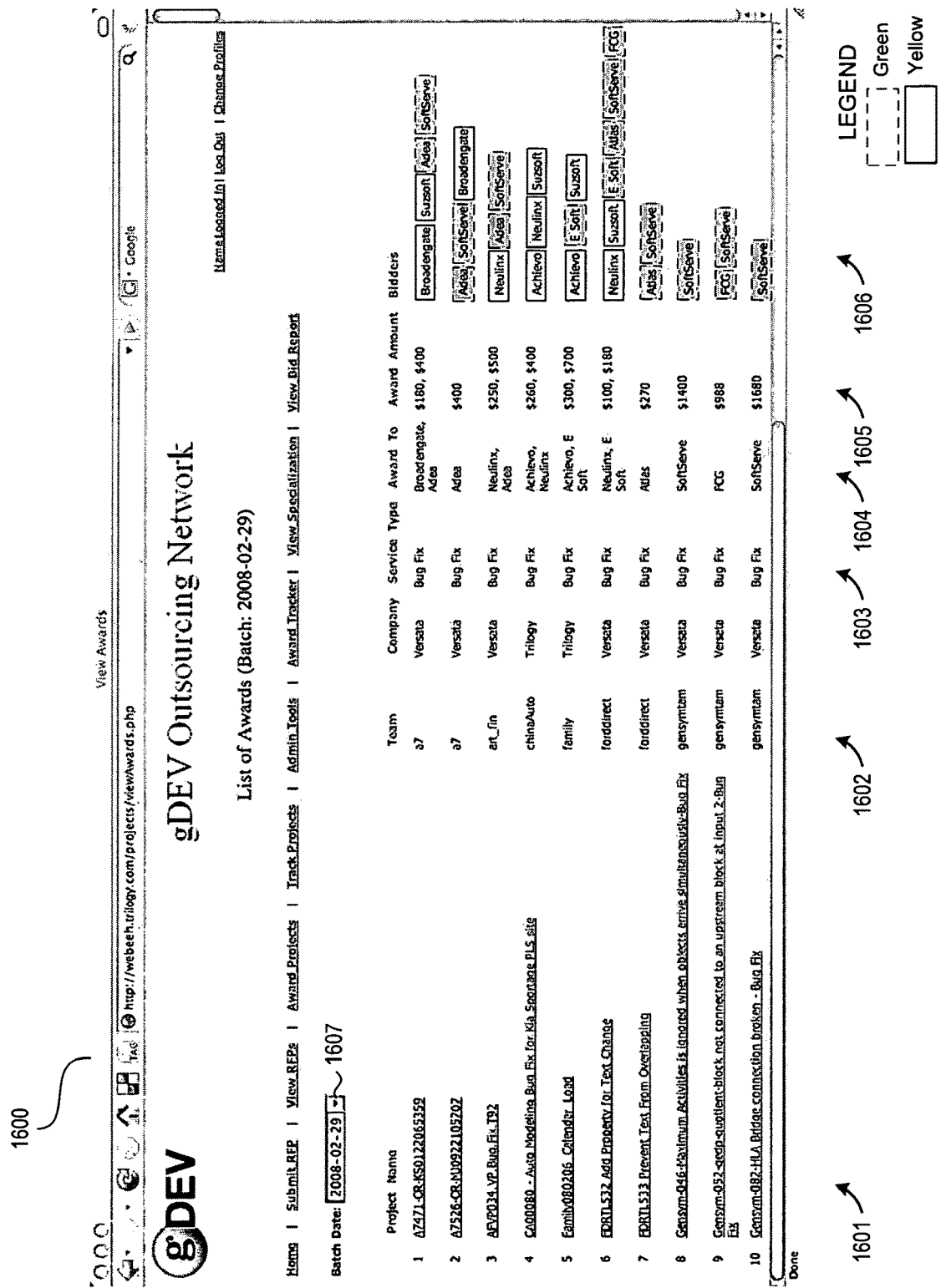

With the "View Awards" link 1303, the outsourcing network generates an award list page 1600 of RFP projects (e.g., 1-10) that have been awarded, as illustrated by way of example with FIG. 16. As depicted, the award list page 1600 may include, for each awarded RFP project 1601, the name of the company and team who issued the RFP project 1602, an identifier of the service type 1603 used to create the project RFP (e.g., Bug Fix, Double-Double-Double, etc.), the vendor(s) awarded the project RFP 1604, the amount(s) of the winning award(s) 1605, and the names of all bidders on the RFP project 1606. As described above, the list of vendors that submitted bids 1606 may include a visual indication for each vendor as to whether the vendor has been qualified as a specialist by the consumer company. The award list page 1600 may display awarded RFP projects that are grouped by batch date using a batch selection window 1607 so that only awarded RFP projects from a given batch date range are shown.

Figure 17:
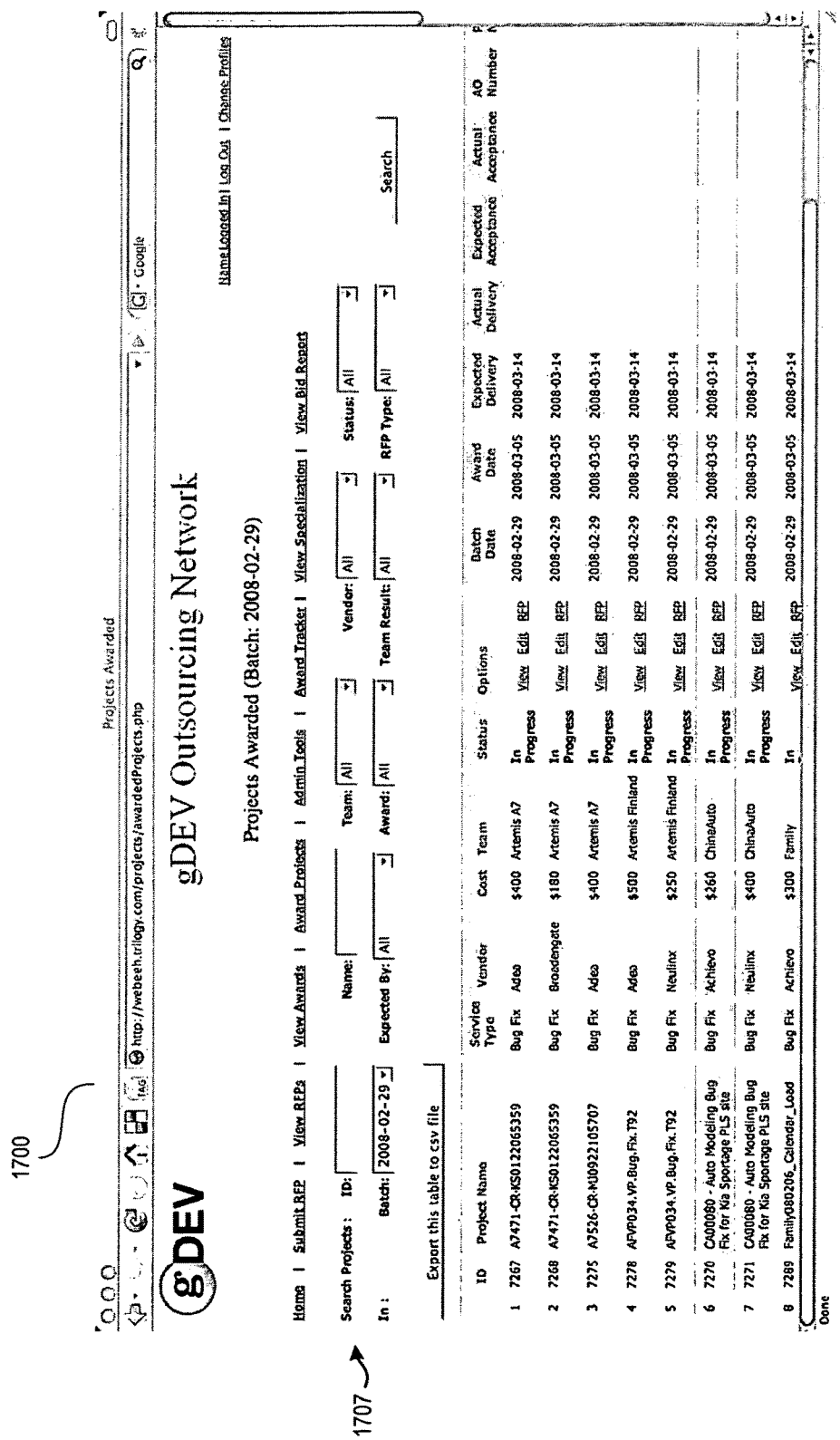

With the "Track Projects" link 1305, the outsourcing network generates an awarded project status page 1700 as illustrated by way of example with FIG. 17. As depicted, the awarded project status page 1700 may include, for each awarded RFP project 1701, an identifier of the service type 1702 used to create the project RFP (e.g., Bug Fix, Double-Double-Double, etc.), the vendor(s) awarded the project 1703, the amount(s) of the winning award(s) 1704, the name of the company and team who issued the RFP project, and status information 1705 for the RFP project. The displayed status information 1705 indicates if the project is "in progress," a "success" or a "failure." Each displayed project may also include one or more options 1706 for viewing or editing the awarded project or the associated RFP. In addition, each awarded project includes one or more date fields 1707 for identifying important dates for the project, such as the batch date, award date, expected delivery date, actual delivery date, expected acceptance date, actual acceptance date, etc. For example, an expected acceptance date may identify a date when the vendor's product is evaluated to see if it satisfies the objective evaluation metrics from the RFP for the project. The awarded project status page 1700 may also include one or more search windows 1708 to search for projects for display in the awarded project status page 1700.

With the "View Specialization" link 1308, the outsourcing network generates a specialization records page 1800 of vendor bids that are organized by service type, as illustrated by way of example with FIG. 18. As depicted, the specialization records page 1800 may include, for each service type 1801, a historical success rate calculation 1802, a current success rate calculation 1803, and a rating indication 1804 if the vendor is rated as a specialist for the particular service. The historical success rate calculation 1802 may provide a quantification of how successful the vendor's bids were over a selected time frame, while the current success rate calculation 1803 may provide a quantification of how successful the vendor's bids have been in a more recent or current time frame. The specialization records page 1800 may display vendor bids that are grouped by vendor using a vendor selection window 1805 so that only bid information pertaining to a selected vendor are shown.

Figure 19:
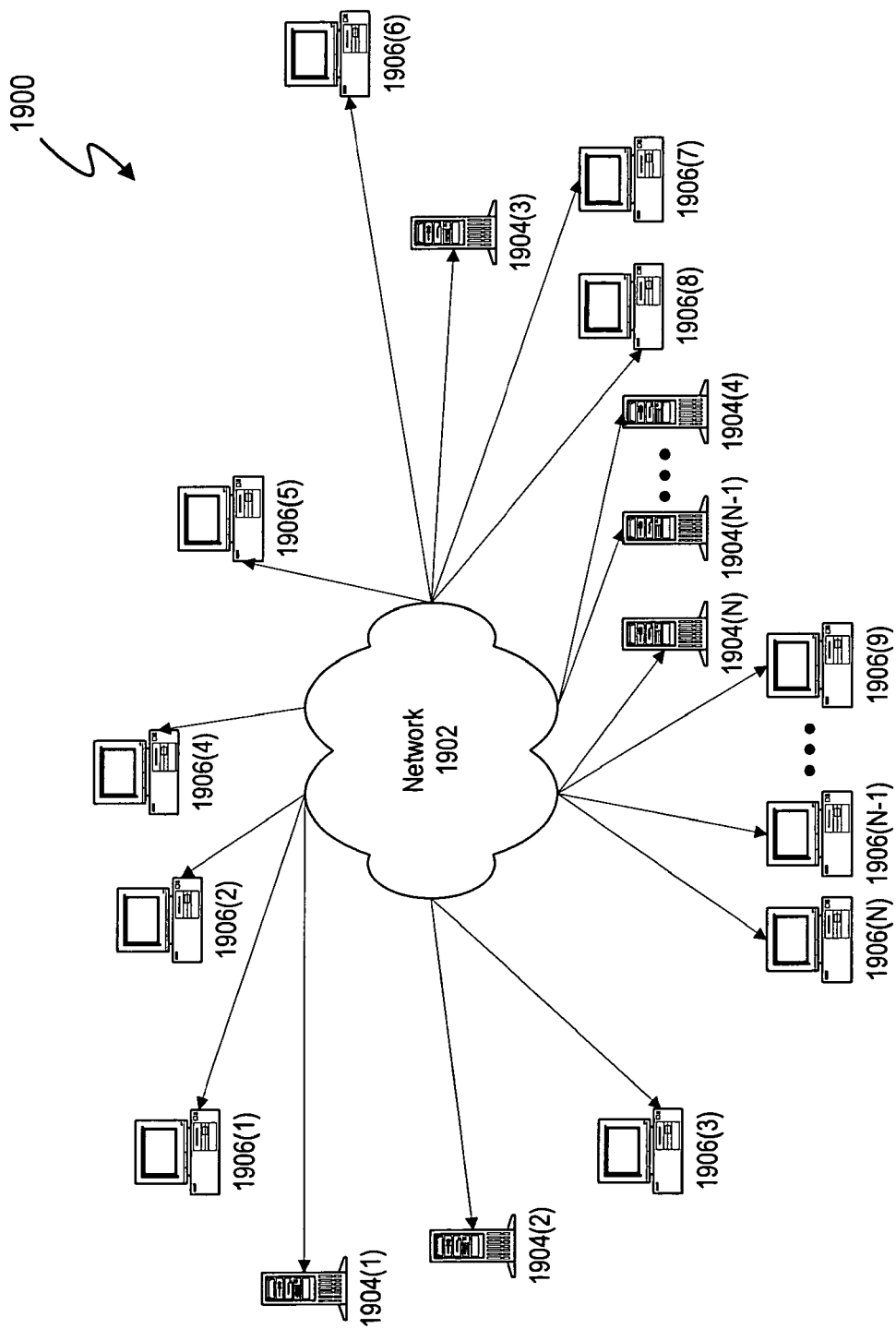
FIG. 19 depicts a network in which the system and method for outsourcing projects can be used.

FIG. 19 is a block diagram illustrating a network environment 1900 in which a system and method for outsourcing projects may be practiced. Network 1902 (e.g. a private wide area network (WAN) or the Internet) connects a number of networked server computer systems 1904(1)-(N) that are accessible by client computer systems 1906(1)-(N), where N is the number of server computer systems connected to the network. Communication between client computer systems 1906(1)-(N) and server computer systems 1904(1)-(N) typically occurs over a network, such as a public switched telephone network over asynchronous digital subscriber line (ADSL) telephone lines or high-bandwidth trunks, for example communications channels providing T1 or OC3 service. Client computer systems 1906(1)-(N) typically access server computer systems 1904(1)-(N) through a service provider, such as an internet service provider ("ISP") by executing application specific software, commonly referred to as a browser, on one of client computer systems 1906(1)-(N).

Client computer systems 1906(1)-(N) and/or server computer systems 1904(1)-(N) may be, for example, computer systems of any appropriate design, including a mainframe, a mini-computer, a personal computer system including notebook computers, a wireless, mobile computing device (including personal digital assistants). These computer systems are typically information handling systems, which are designed to provide computing power to one or more users, either locally or remotely. Such a computer system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device.

As described herein, qualified partners may be used to define mini-networks of vendor suppliers in the network environment 1900 by using a server computer system (e.g., 1904(1)) to implement an outsourcing network for an outsourcing company. At the server computer system 1904(1), executable instructions and data are executed to generate or receive a one-page request for proposal document from the outsourcing company which specifies a discrete, short-term project with objective evaluation metrics. The server computer system 1904(1) distributes the RFP over the network 1902 to one or more vendor companies which use the client computer systems 1906(1)-(N) or other server computer systems 1904(2)-(N) to access the RFP and to provide bids in response to the RFP. In selected embodiments, the outsourcing company distributes the RFP to only a subset of the vendors that are qualified as specialists for a given RFP project service area. For example, if the vendors at client computers 1906(1), 1906(2) and 1906(4) are qualified as specialist vendors for the double-double-double service, then the outsourcing company uses the server computer system 1904(1) to email the RFP to only the specialists vendors 1906(1), 1906(2) and 1906(4). Based on their acquired experience or expertise, the specialist vendors respond to the RFP by submitting bids to the outsourcing company for display at the server computer system 1904(1). In this way, the server computer system 1904(1) provides an outsourcing network for an outsourcing company and its vendors to automate submission of RFPs, view submitted RFPs, view awards, award RFP projects, track projects and awards, qualify vendors as specialists, etc. By confining the distribution of RFPs to qualified specialist vendors (and possible other vendors that have expressed an interest in the relevant technology area), mini-bidding networks are established which promote efficiency and expertise in specific outsourcing technology areas, thereby facilitating project outsourcing.

Figure 20:
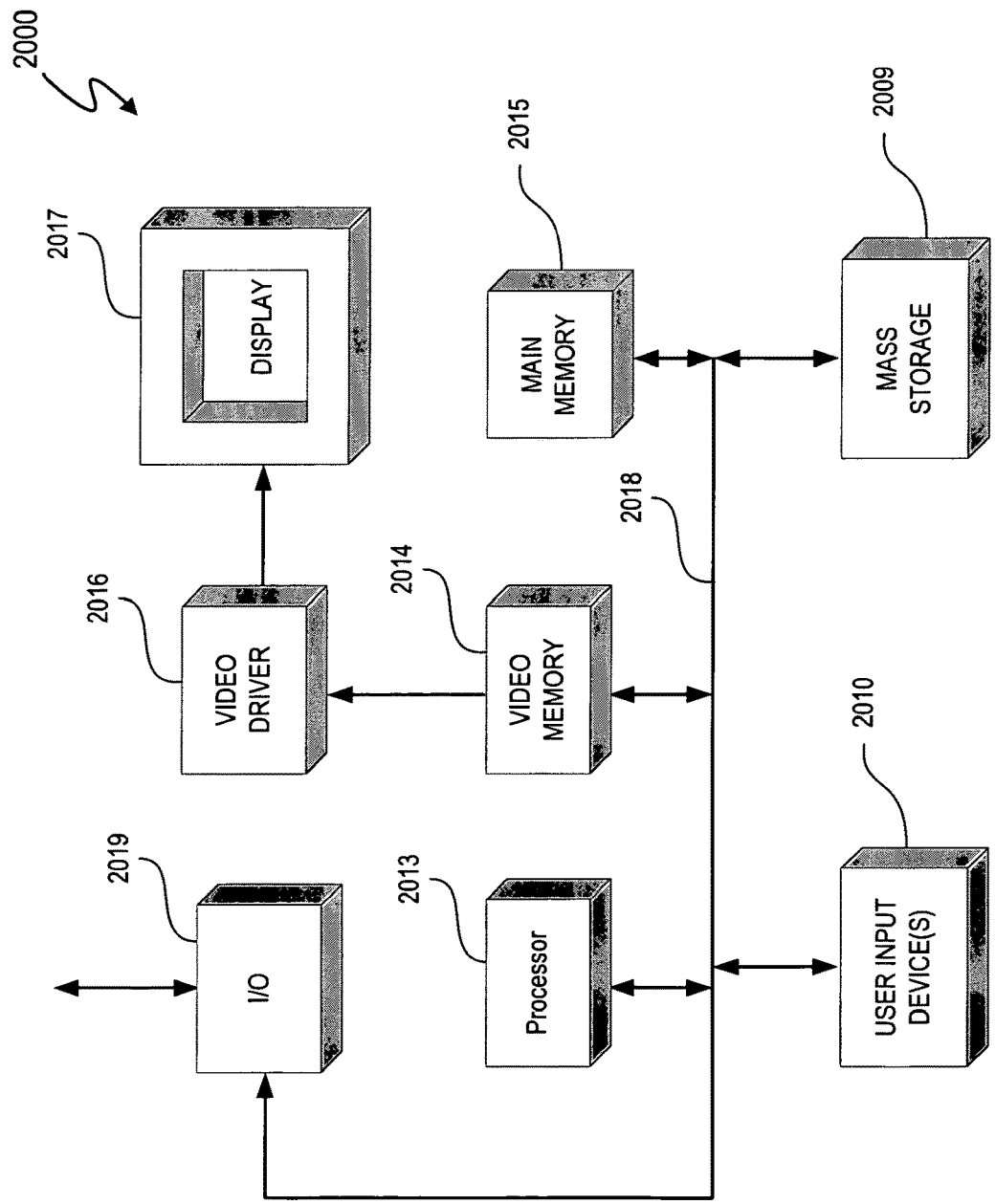
FIG. 20 depicts a computer system for use by the system and method for outsourcing projects.

Embodiments of the system and method for outsourcing projects can be implemented on a computer system such as a general-purpose computer 2000 illustrated in FIG. 20. Input user device(s) 2010, such as a keyboard and/or mouse, are coupled to a bi-directional system bus 2018. The input user device(s) 2010 are for introducing user input to the computer system and communicating that user input to processor 2013. The computer system of FIG. 20 generally also includes a video memory 2014, main memory 2015 and mass storage 2009, all coupled to bi-directional system bus 2018 along with input user device(s) 2010 and processor 2013. The mass storage 2009 may include both fixed and removable media, such as other available mass storage technology. Bus 2018 may contain, for example, 32 address lines for addressing video memory 2014 or main memory 2015. The system bus 2018 also includes, for example, an n-bit data bus for transferring data between and among the components, such as CPU 2013, main memory 2015, video memory 2014 and mass storage 2009, where "n" is, for example, 32 or 64. Alternatively, multiplex data/address lines may be used instead of separate data and address lines.

I/O device(s) 2019 may provide connections to peripheral devices, such as a printer, and may also provide a direct connection to remote server computer systems via a telephone link or to the Internet via an ISP. I/O device(s) 2019 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 2009 until loaded into main memory 2015 for execution. Computer programs may also be in the form of electronic signals modulated in accordance with the computer program and data communication technology when transferred via a network. The method and functions relating to system and method for outsourcing projects may be implemented in a computer program alone or in conjunction manual processes.

The processor 2013, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 2015 is comprised of dynamic random access memory (DRAM). Video memory 2014 is a dual-ported video random access memory. One port of the video memory 2014 is coupled to video amplifier 2016. The video amplifier 2016 is used to drive the display 2017. Video amplifier 2016 is well known in the art and may be implemented by any suitable means. This circuitry converts pixel data stored in video memory 2014 to a raster signal suitable for use by display 2017. Display 2017 is a type of monitor suitable for displaying graphic images.

As will be appreciated, any number of discrete service definitions may be used to generate RFPs by defining the discrete services with fixed inputs and outputs and objective evaluation metrics. For example, FIGS. 21-39 depict another exemplary set of discrete services that can be used to efficiently generate an RFP, develop a bid, and evaluate a completed project. For example, a "2× Service" (depicted in FIG. 21) specifies one or more performance measures to be improved by defining fixed inputs and outputs as described in FIG. 21. An "API Fulfillment Service" (depicted in FIG. 22) specifies that an interface implementation be provided by defining fixed inputs and outputs as described in FIG. 22. An "Automated Test Case Creation Service" (depicted in FIG. 23) specifies that a set of test cases be provided which automatically run every time a codebase change is made by defining fixed inputs and outputs as described in FIG. 23. In a "Bug Fix Service" (depicted in FIG. 24), bug fix services are specified by defining fixed inputs and outputs as described in FIG. 24. A service entitled "Build Management Service—Dependencies" (depicted in FIG. 25) specifies how a product codebase is to be revised to retrieve dependent libraries for various operations by defining fixed inputs and outputs as described in FIG. 25. In similar fashion, a service entitled "Build Management Service—Metrics" (depicted in FIG. 26) specifies how to modify a build system of a product codebase to support generation of common metrics by defining fixed inputs and outputs as described in FIG. 26. A "Continuous Integration Setup Service" (depicted in FIG. 27) specifies that a product configuration be provided which operates in a Continuous Integration environment by defining fixed inputs and outputs as described in FIG. 27. In the "Large Use Case Implementation Service" (depicted in FIG. 28), the service specifies a new codebase that is to provide new functionality for a large use case (including, testing, debugging, and build work) by defining fixed inputs and outputs as described in FIG. 28. A "Manual Testing Service" (depicted in FIG. 29) specifies a set of manual test cases to be run periodically by defining fixed inputs and outputs as described in FIG. 29. A "Refactoring Service" (depicted in FIG. 30) specifies a refactoring requirement for a given codebase to achieve a specified Maintainability Index by defining fixed inputs and outputs as described in FIG. 30. In a "Scoring Service" (depicted in FIGS. 31A and 31B), specifies that a model be created having a performance that exceeds a performance threshold by defining fixed inputs and outputs as described in FIGS. 31A and 31B. In the "Small Use Case Implementation" (depicted in FIG. 32), the service specifies a new codebase that is to provide new functionality for a single use case (including, testing, debugging, and build work) by defining fixed inputs and outputs as described in FIG. 32. A "Specification Fulfillment Service" (depicted in FIG. 33) specifies that a codebase be provided that meets a set of software specifications by defining fixed inputs and outputs as described in FIG. 33. A "Test Case Definition Service" (depicted in FIG. 34) specifies that test cases be provided to cover product functionality in selected use cases by defining fixed inputs and outputs as described in FIG. 34. The "UI Fulfillment Service" (depicted in FIG. 35) specifies how to provide an implementation to support a given interface specification by defining fixed inputs and outputs as described in FIG. 35. A "Two Week Use Case Modification Service" (depicted in FIG. 36) specifies how to provide an new codebase that meets an incremental change in functionality by defining fixed inputs and outputs as described in FIG. 36. A "Virtual Image Optimization Service" (depicted in FIG. 37) specifies how to optimize development and production virtual images by defining fixed inputs and outputs as described in FIG. 37. A "Visual Design Service" (depicted in FIG. 38) specifies how to generate a set of graphic images to provide a visual design for an application by defining fixed inputs and outputs as described in FIG. 38. A "Website Prototyping Service" (depicted in FIG. 39) specifies how to prototype a web page for integration into an existing site by defining fixed inputs and outputs as described in FIG. 39.

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to improve the generation of attribute-based rules. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for outsourcing projects may be implemented in any type of computer system or programming or processing environment. It is contemplated that the system and method for outsourcing projects might be run on a stand-alone computer system, such as the one described above. The system and method for outsourcing projects might also be run from a server computer systems system that can be accessed by a plurality of client computer systems interconnected over an intranet network. Finally, the system and method for outsourcing projects may be run from a server computer system that is accessible to clients over the Internet.

Many embodiments of the present invention have application to a wide range of industries and products including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer-based system for configuring a computer system to utilize a digital data structure to implement a structured request for proposal to efficiently process software projects for a first entity including generating requests for proposals and submitting and automatically evaluating the software projects, the system comprising:
- a processor; and
- a memory, coupled to the processor, wherein the memory stores code that when executed by the processor causes the processor to perform operations comprising:
  - create a digital data structure to implement a structured request for proposal to solicit bids from one or more vendor entities to perform a discrete software project identified in the request for proposal, wherein the digital data structure includes fields to (i) register a predefined service identifier which specifies the software project to improve execution of software, (ii) populate with fixed inputs and outputs data and objective evaluation metrics data, and the predefined service identifier and the populated data allow an automated evaluation software tool to objectively evaluate the software project;
  - distribute, to one or more computer systems in a network of computer systems, the digital data structure representing the structured request for proposal;
  - receive and store in electronic memory for access by the processor one or more bids from the one or more computer systems in the network of computer systems;
  - process rules to automatically evaluate the software project after submission in accordance with at least a subset of the objective evaluation metrics data that coordinate with the digital data structure fields to determine if the software project complies with the objective evaluation metrics and to identify a software project that is determined to comply with the objective evaluation metrics data; and
  - transmit selection of the software project that complies with the objective evaluation metrics data to cause the software project to be performed and modify the software and improve execution performance of the software.

2. The system of claim 1, wherein to define the request for proposal comprises to generate a written description of the discrete, short term software project that fits within a single page.

3. The system of claim 1, wherein to define the request for proposal comprises to generate a written description of the discrete, short term software project that requires completion within four weeks of the software project being awarded.

4. The system of claim 1, wherein to define the request for proposal comprises to use a predefined double-double-double service identifier which specifies a discrete, short-term software project in terms of three performance metrics for an existing product which must be improved by a factor of two for the software project to be accepted.

5. The of claim 4, where the predefined double-double-double service identifier specifies a speed performance metric which must be doubled, a memory performance metric which must be halved, and a scale performance metric which must be doubled for the software project to be accepted.

6. The system of claim 1, wherein to define the request for proposal comprises to use a predefined refactoring service identifier which specifies a discrete, short-term software project in terms of an objectively defined code quality metric for an existing product which must be improved by a specified amount without changing functionality or performance of the existing product for the software project to be accepted.

7. The of claim 6, where the predefined refactoring service identifier specifies a minimum maintainability index (MI) value which must be achieved without changing functionality or performance of the existing product for the software project to be accepted.

8. The system of claim 1, wherein to define the request for proposal comprises to use a predefined code coverage service identifier which specifies a discrete, short-term software project in terms of an automated test suite for a given codebase that meets a first predetermined percentage method requirement and a second predetermined percentage line coverage requirement for the software project to be accepted.

9. The system of claim 8, wherein to define the request for proposal comprises to use a predefined code coverage service identifier which specifies a discrete, short-term software project in terms of an automated test suite for a given codebase that meets 100 percent method and 90 percent line coverage for the software project to be accepted.

10. The system of claim 1, wherein to define the request for proposal comprises to specify a forecast of how many bids for software projects having the same predefined service identifier will be solicited in the future over a specified time frame.

11. The system of claim 1, wherein the code is further executable by the processor to cause the processor to perform operations comprising qualifying one or more of the vendor entities as a specialist once a vendor entity has acquired a predetermined amount of experience, efficiency or expertise.

12. The system of claim 11, where distributing the request for proposal comprises distributing the request for proposal to only specialist vendor entities.

13. The system of claim 11, where awarding the software project comprises awarding the software project to a specialist vendor entity that submits the lowest bidding price for the software project.

* * * * *